US012471888B2

(12) United States Patent
Egan et al.

(10) Patent No.: US 12,471,888 B2
(45) Date of Patent: Nov. 18, 2025

(54) METHODS, SYSTEMS, AND COMPUTER READABLE MEDIA FOR UTILIZING ULTRASOUND MULTIPLE SCATTERING TO ACCESS PULMONARY FIBROSIS

(71) Applicants: The University of North Carolina at Chapel Hill, Chapel Hill, NC (US); North Carolina State University, Raleigh, NC (US)

(72) Inventors: Thomas Michael Egan, Durham, NC (US); Marie Meryem Muller, Durham, NC (US); Kaustav Mohanty, Wauwatosa, WI (US)

(73) Assignees: NORTH CAROLINA STATE UNIVERSITY, Raleigh, NC (US); THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 148 days.

(21) Appl. No.: 17/237,931

(22) Filed: Apr. 22, 2021

(65) Prior Publication Data
US 2021/0393241 A1 Dec. 23, 2021

Related U.S. Application Data

(60) Provisional application No. 63/014,092, filed on Apr. 22, 2020.

(51) Int. Cl.
A61B 8/00 (2006.01)
A61B 6/00 (2024.01)
(Continued)

(52) U.S. Cl.
CPC ............ A61B 8/5223 (2013.01); A61B 6/032 (2013.01); A61B 6/5247 (2013.01);
(Continued)

(58) Field of Classification Search
CPC ..... A61B 8/5223; A61B 6/032; A61B 6/5247; A61B 8/0833; A61B 8/4209; A61B 8/4488; A61B 8/5261; A61B 8/085
See application file for complete search history.

(56) References Cited

U.S. PATENT DOCUMENTS 8,485,977 B2 * 7/2013 Hirama ............... G01S 15/8927
600/407
2018/0275141 A1 * 9/2018 Ziady ................. G01N 33/6893
(Continued)

FOREIGN PATENT DOCUMENTS

JP 01291843 A * 11/1989

OTHER PUBLICATIONS

Mohanty et al., "Characterization of the Lung Parenchyma Using Ultrasound Multiple Scattering", 2017, Ultrasound in Med.&Bio., vol. 43, No. 5, 993-1003 (Year: 2017).*
(Continued)

Primary Examiner — Keith M Raymond
Assistant Examiner — Andrew W Begeman
(74) Attorney, Agent, or Firm — Jenkins, Taylor & Hunt, P.A.

(57) ABSTRACT

Methods, systems, and computer readable media for utilizing ultrasound multiple scattering to assess pulmonary fibrosis are disclosed. One method may comprise transmitting ultrasound energy into the lungs of a subject, detecting portions of the ultrasound energy backscattered by structures in the lungs of the subject, calculating a transport parameter from the detected portions of the ultrasound energy backscattered by the structures in the lungs of the subject, inputting the transport parameter into a model that correlates values of the transport parameter with quantitative indications of severity of pulmonary fibrosis, and receiving, from the model, a quantitative indication of the severity of pul-
(Continued)

monary fibrosis for the subject that correlates with the transport parameter for the subject.

30 Claims, 14 Drawing Sheets
(11 of 14 Drawing Sheet(s) Filed in Color)

(51) Int. Cl.
    *A61B 6/03*         (2006.01)
    *A61B 8/08*         (2006.01)
(52) U.S. Cl.
    CPC .......... *A61B 8/0833* (2013.01); *A61B 8/4209* (2013.01); *A61B 8/4488* (2013.01); *A61B 8/5261* (2013.01)

(56) References Cited

U.S. PATENT DOCUMENTS

| | | | | |
|---|---|---|---|---|
| 2019/0164642 | A1* | 5/2019 | Hartung | G06N 3/08 |
| 2022/0287618 | A1* | 9/2022 | Ikushima | G01R 33/02 |
| 2022/0327693 | A1* | 10/2022 | Kim | G06N 3/006 |
| 2023/0050956 | A1* | 2/2023 | Hysi | A61B 8/5223 |

OTHER PUBLICATIONS

JP01291843A (Fujistu Ltd). Translated by google patents. Nov. 24, 1989 [retrieved on Jan. 26, 2023] (Year: 1986).*
Song et al."Performance of 2-D ultrasound shear wave elastography in liver fibrosis detection using magnetic resonance elastography as the reference standard: A pilot study", 2016, J Ultrasound Med., vol. 35, No. 2, 410-412 (Year: 2016).*
Agricola, et al., "Ultrasound Comet-Tail Images': A Marker of Pulmonary Edema." Chest. vol. 127 May 5, 2005.
Ashcroft, et al., "Simple Method of Estimating Severity of Pulmonary Fibrosis on a Numerical Scale." Journal of Clinical Pathology 41 (4): 467-70. 1988.
Aubry et al., "Ultrasonic Imaging of Highly Scattering Media from Local Measurements of the Diffusion Constant: Separation of Coherent and Incoherent Intensities." Physical Review E—Statistical, Nonlinear, and Soft Matter Physics 2007. 75 (2): 1-9.
Aubry et al., "Local Measurements of the Diffusion Constant in Multiple Scattering Media: Application to Human Trabecular Bone Imaging." The Journal of the Acoustical Society of America. 2008. 123 (5): 3633.
Bouhemoud et al., "Clinical review: Bedside lung ultrasound in critical care practice", Critical Care, vol. 11, No. 1, Feb. 16, 2007.
Chaudhary, et al., "Pharmacologic Differentiation of Inflammation and Fibrosis in the Rat Bleomycin Model." American Journal of Respiratory and Critical Care Medicine. 2006.
Crystal, et al., "Future Research Directions in Idiopathic Pulmonary Fibrosis: Summary of a National Heart, Lung, and Blood Institute Working Group." American Journal of Respiratory and Critical Care Medicine vol. 166 (2): pp. 236-246. 2002.
Desai, et al., "CT Features of Lung Disease in Patients with Systemic Sclerosis: Comparison with Idiopathic Pulmonary Fibrosis and Nonspecific Interstitial Pneumonia." Radiology. Aug. 2004. vol. 232, No. 4, pp. 560-567.
Gargani, et al., "Ultrasound Lung Comets for the Differential Diagnosis of Acute Cardiogenic Dyspnoea: A Comparison with Natriuretic Peptides." European Journal of Heart Failure. 2008.
Gargani, et al., "Ultrasound Lung Comets in Systemic Sclerosis: A Chest Sonography Hallmark of Pulmonary Interstitial Fibrosis." Rheumatology (Oxford, England) Aug. 28, 2009—pp. 1382-1387.
Hübner, et al., "Standardized quantification of pulmonary fibrosis in histological samples", BioTechniques 44 (4): 507-17, Apr. 2008.
Jambrik, et al., "Usefulness of Ultrasound Lung Comets as a Nonradiologic Sign of Extravascular Lung Water." American Journal of Cardiology. 2004.
Katzenstein, et al., "Idiopathic Pulmonary Fibrosis Clinical Relevance of Pathologic Classification Clinical Features of the Idiopathic Interstitial Pneumonias." American Journal of Respiratory and Critical Care Medicine 157: 1301-15. 1998.
Launay et al., "High Resolution Computed Tomography in Fibrosing Alveolitis Associated with Systemic Sclerosis", Journal of Rheumatology, 33:9, Mar. 16, 2006.
Lichtenstein, Daniel A. 2016. Lung Ultrasound in the Critically Ill. The Blue Protocol. Annals of Intensive Care. 2014. 4:1.
Moeller, et al., "The Bleomycin Animal Model: A Useful Tool to Investigate Treatment Options for Idiopathic Pulmonary Fibrosis?" International Journal of Biochemistry and Cell Biology 40 (3): 362-82. 2008.
Picano, et al., "Ultrasound Lung Comets: A Clinically Useful Sign of Extravascular Lung Water." Journal of the American Society of Echocardiography. May 19, 2005.
Reißig, Angelika, and Claus Kroegel. "Transthoracic Sonography of Diffuse Parenchymal Lung Disease: The Role of Comet Tail Artifacts." Journal of Ultrasound in Medicine. 22:173-180. 2003.
Robbe, et al., "Intratracheal Bleomycin Aerosolization: The Best Route of Administration for a Scalable and Homogeneous Pulmonary Fibrosis Rat Model?" BioMed Research International. 2015.
Rojas, et al., "Bone Marrow-Derived Mesenchymal Stem Cells in Repair of the Injured Lung." American Journal of Respiratory Cell and Molecular Biology. Am J Respir Cell Mol Biol vol. 33 pp. 145-152, 2005.
Sayed, et al., "Assessment of Transthoracic Sonography in Patients with Interstitial Lung Diseases." Egyptian Journal of Bronchology 10 (2): 105. 2016.
Soldati, G. and S. Sher., "Bedside Lung Ultrasound in Critical Care Practice." Minerva Anestesiologica vol. 75 No. 9: 509-17. 2009.
Tourin, et al., "Transport Parameters for an Ultrasonic Pulsed Wave Propagating in a Multiple Scattering Medium." The Journal of the Acoustical Society of America 108 (2): 503. 2000.
Volpicelli, et al., "Bedside Lung Ultrasound in the Assessment of Alveolar-Interstitial Syndrome." American Journal of Emergency Medicine 24 (6): 689-96. 2006.
Xu, Jianguo, et al., "Increased Bleomycin-Induced Lung Injury in Mice Deficient in the Transcription Factor T-Bet." American Journal of Physiology-Lung Cellular and Molecular Physiology. 2006.
Yang, et al., "Lung Water Detection Using Acoustic Techniques." Conference Proceedings : . . . Annual International Conference of the IEEE Engineering in Medicine and Biology Society. IEEE Engineering in Medicine and Biology Society. Annual Conference 2012: 4258-61.

* cited by examiner

METHODS, SYSTEMS, AND COMPUTER READABLE MEDIA FOR UTILIZING ULTRASOUND MULTIPLE SCATTERING TO ACCESS PULMONARY FIBROSIS

CROSS-REFERENCE TO RELATED APPLICATIONS

This application claims benefit of U.S. Provisional Patent Application Ser. No. 63/014,092, filed Apr. 22, 2020, the disclosure of which is incorporated by reference herein in its entirety.

GOVERNMENT INTEREST

The present invention was made with United States Government support under grant number W81WH1810101 awarded by the U.S. Army Medical Research and Development Command. The United States government has certain rights in the invention.

TECHNICAL FIELD

The subject matter described herein relates to utilizing ultrasound energy to screen, diagnose or monitor lung conditions and abnormalities. More specifically, the subject matter relates to methods, systems, and computer readable media for utilizing ultrasound multiple scattering to assess pulmonary fibrosis.

BACKGROUND

Pulmonary fibrosis is a progressive, fatal, inflammatory and fibro-proliferative lung disease. The main histopathological features of pulmonary fibrosis, best seen at low magnification, is a heterogeneous appearance with areas of sub-pleural and para-septal fibrosis and honeycombing alternating with areas of less affected or normal parenchyma, heterogeneously distributed. For example, honeycombing can occur when cystic fibrotic airspaces are filled by mucin and various numbers of inflammatory cells. In pulmonary fibrosis, interstitial lobular septa can be thickened by collagen tissue accumulation, forming patchy scars and leading to chronic inflammation.

Conventional chest radiography and high-resolution computer tomography (HRCT) are currently the most common techniques to diagnose pulmonary fibrosis as well as assess treatment efficiency. Utilizing HRCT of the chest to capture internal images has been found to be a sensitive and reproducible method to assess the extent and pattern of pulmonary fibrosis within a subject. However, the use of HRCT is associated with high radiation, high costs, and very low portability. All of these disadvantages present a particular challenge in the context of patient monitoring, where repeated evaluations must be made for each subject.

At present, lung ultrasound (LUS) is a less costly, non-invasive, and portable modality. Notably, LUS has multiple uses, both in diagnosis as well as intervention. Evidence has shown that LUS, as a consequence of its advantages over radiography and HRCT (i.e., no radiation exposure, cost effective, and high portability) can play a primary role in monitoring the severity of pulmonary fibrosis. However, the presence of air-filled alveoli has long been considered a major obstacle to ultrasound imaging, leading to numerous artifacts. Lately, these artifacts have been recognized to have some diagnostic potential with respect to conventional ultrasound, but they remain qualitative and operator-dependent.

Accordingly, there exists a need for improved methods, systems, and computer readable media for utilizing ultrasound multiple scattering to assess pulmonary fibrosis.

SUMMARY

According to one aspect, the subject matter described herein relates to an exemplary method for utilizing ultrasound multiple scattering to assess pulmonary fibrosis. The method comprises transmitting ultrasound energy into the lungs of a subject, detecting portions of the ultrasound energy backscattered by structures in the lungs of the subject, calculating a transport parameter from the detected portions of the ultrasound energy backscattered by the structures in the lungs of the subject, inputting the transport parameter into a model that correlates values of the transport parameter with quantitative indications of severity of pulmonary fibrosis, and receiving, from the model, a quantitative indication of the severity of pulmonary fibrosis for the subject that correlates with the transport parameter for the subject.

According to another aspect, the subject matter described herein relates to an exemplary system for utilizing ultrasound multiple scattering to assess pulmonary fibrosis. The system comprises at least one processor, a memory, and an array of ultrasound transducer elements configured to emit ultrasound signals and to receive backscattered ultrasound energy in the lungs of a subject. The system further includes a pulmonary severity assessment engine (e.g., in some embodiments, a software pulmonary severity assessment algorithm and/or method that is executable by a processor) that, when stored in the memory and executed by the processor, is configured to detect portions of the ultrasound energy backscattered by structures in the lungs of the subject, calculating a transport parameter from the detected portions of the ultrasound energy backscattered by the structures in the lungs of the subject, input the transport parameter into a model that correlates values of the transport parameter with quantitative indications of severity of pulmonary fibrosis, and receive, from the model, a quantitative indication of the severity of pulmonary fibrosis for the subject that correlates with the transport parameter for the subject.

The subject matter described herein may be implemented in hardware, software, firmware, or any combination thereof. As such, the terms "function", "node", or "engine" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter described herein will now be explained with reference to the accompanying drawings of which.

DETAILED DESCRIPTION

It will be understood that various details of the presently disclosed subject matter may be changed without departing from the scope of the presently disclosed subject matter. Furthermore, the foregoing description is for the purpose of illustration only, and not for the purpose of limitation. As indicated above, the subject matter described herein relates to methods, systems, and non-transitory computer readable media for utilizing ultrasound multiple scattering to assess pulmonary fibrosis (or any other adverse lung condition, such as pneumonia, burn pit injury, and the like). The quantification of severity of pulmonary fibrosis is determined non-invasively using ultrasound by measuring ultrasound energy backscattered from a subject's lungs, calculating a transport parameter, such as a diffusion constant or a transport mean free path, from the backscattered ultrasound energy, and inputting transport parameter into a model that correlates values of the transport parameter with quantitative indications of severity of pulmonary fibrosis (e.g., when a subject is diagnosed with the same). The quantitative indications of severity of pulmonary fibrosis can be used to characterize an amount or severity of pulmonary fibrosis (or any other adverse lung condition) that is present in the subject's lungs as compared to 'ground truth measurements' of pulmonary fibrosis severity obtained from other reliable non-ultrasound methods, such as computed tomography scanning, pulmonary function tests, or histological studies of subjects with different degrees of severity of pulmonary fibrosis. Notably, the severity of pulmonary fibrosis (and/or other lung abnormalities) can be determined using the correlations between these ground truth measurements and ultrasound-derived measurements. While the comparison of ground truth measurements and ultrasound-derived measurements of different subjects is feasible, there is particular advantage to using the progression of pulmonary fibrosis (or any other adverse lung conditions) in a single patient after an initial diagnosis is made.

Figure 1:
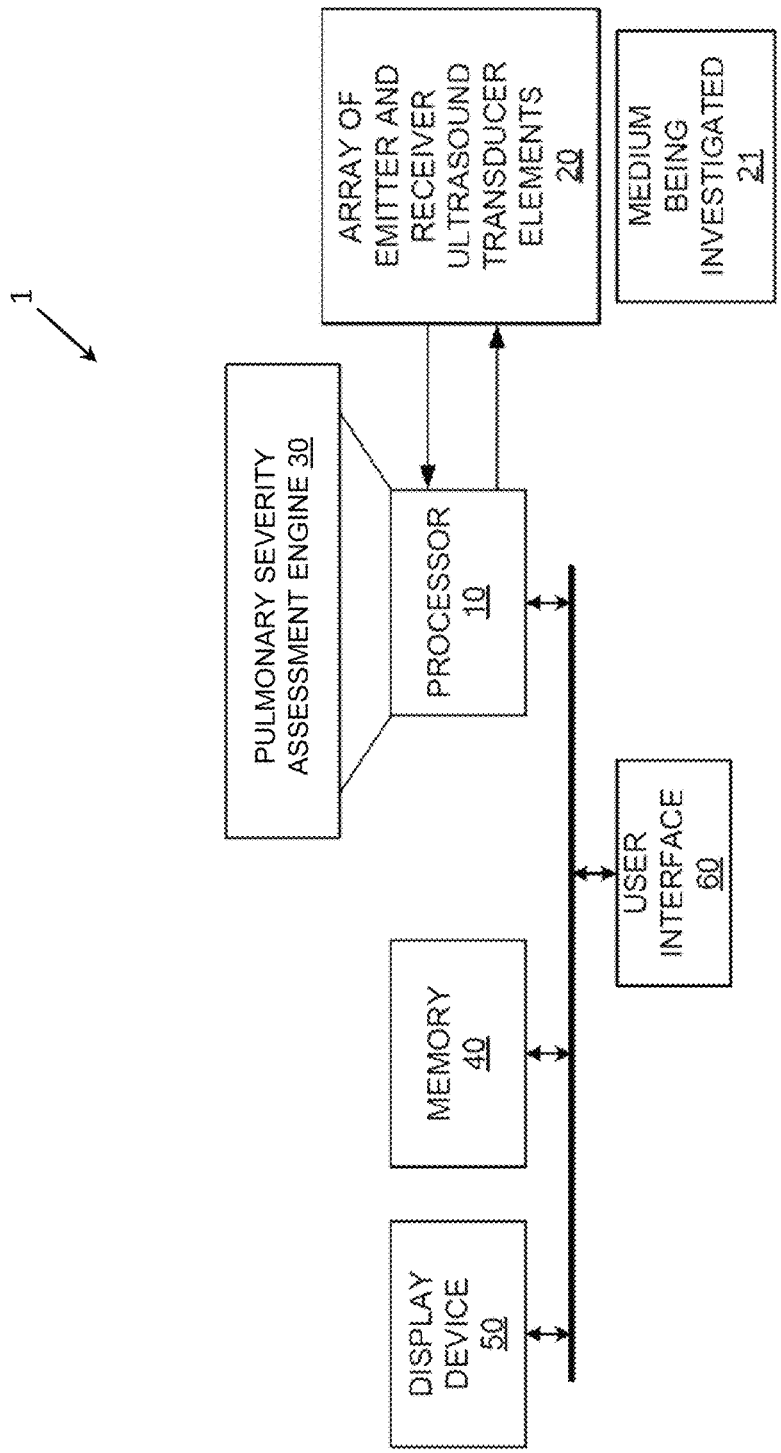
FIG. 1 depicts an exemplary ultrasound system for utilizing ultrasound multiple scattering to assess pulmonary fibrosis according to an embodiment of the subject matter described herein.

FIG. 1 is a block diagram of an ultrasound system 1 in accordance with a representative embodiment. Because it is known how ultrasound systems acquire ultrasound signals, a detailed discussion of the acquisition process is not provided herein in the interest of brevity. In some embodiments, a processor 10 of the ultrasound system 1 can output signals to an array 20 of emitter and receiver ultrasound transducer elements to control the ultrasound image acquisition process. The emitter ultrasound transducer elements of the array 20 emit ultrasound waves that propagate into the multiple scattering medium, which may be any type of biological tissue, living tissue or dead tissue, of any type of subject, human or non-human. As disclosed herein, the ultrasound waves can be emitted into human lungs and non-human lungs for purpose of utilizing ultrasound multiple scattering to assess pulmonary fibrosis. In some embodiments, the ultrasound waves are reflected, or "backscattered", by scatterers within the medium (e.g., the lung). The backscattered ultrasound waves can be received by the receiver transducer elements of the array 20 and converted into electrical ultrasound signals, which are then output to the processor 10 for processing. Additional electrical circuitry not shown in FIG. 1 for ease of illustration may be interposed in between the processor 10 and the array 20 for processing electrical signals output by the processor 10 to the array 20 (e.g., digital-to-analog conversion, amplification, etc.) and/or for processing the ultrasound electrical signals output from the array 20 to the processor (e.g., analog-to-digital conversion, amplification, etc.). The processor 10 executes a pulmonary severity assessment engine 30 to perform a process (e.g., a process comprising a plurality of processing logic elements) and/or algorithm that receives the ultrasound electrical signals and processes the signals to perform the detection of abnormalities contributing to the severity of pulmonary fibrosis in a lung and/or lung specimen.

The ultrasound system 1 may be configured with memory, such as a memory device 40 for storing data and computer instructions for processing and execution of pulmonary severity assessment engine 30 by the processor 10. The pulmonary severity assessment engine 30 may be implemented in hardware, software or firmware, or a combination thereof. The system 1 may also include a display device 50 for displaying information (e.g., severity output values) to a user of the system 1 and a user interface (UI) 60. In some embodiments, the output data may also (or alternatively) be sent to a cloud-based and/or off-site computer system/device. Further, data processing may be performed on a computer device proximate to the patient, or performed another remote computer (e.g., in the cloud).

As described herein, processor 10 may include a central processing unit (e.g., a single core or multiple processing cores), a microprocessor, a microcontroller, a network processor, an application-specific integrated circuit (ASIC), and/or the like. Likewise, memory device 40 may comprise random access memory (RAM), flash memory, a magnetic disk storage drive, and the like. In some embodiments, memory device 40 may be configured to store a pulmonary severity assessment engine 30.

A processing logic (e.g., an executed portion of pulmonary severity assessment engine 30) of the processor 10 processes the received backscattered ultrasound signals to obtain an inter-element response matrix (IRM). In some embodiments, the processing logic of the processor 10 processes the IRM(s) to separate a coherent intensity from an incoherent intensity. Further, the processing logic of the processor 10 can be configured to process the incoherent intensity to obtain a diffusion constant.

In some embodiments, after the processing logic processes the IRM(s) to separate the coherent intensity from the incoherent intensity, the processing logic of the processor 10 processes the coherent intensity instead of the incoherent intensity to obtain the diffusion constant.

Although FIG. 1 illustrates an exemplary ultrasound system configured for executing the pulmonary severity assessment engine 30, other computing systems can be utilized without departing from the scope of the disclosed subject matter. Moreover, the described system in FIG. 1 can be alternatively implemented using via portable ultrasound probes.

Figure 2:
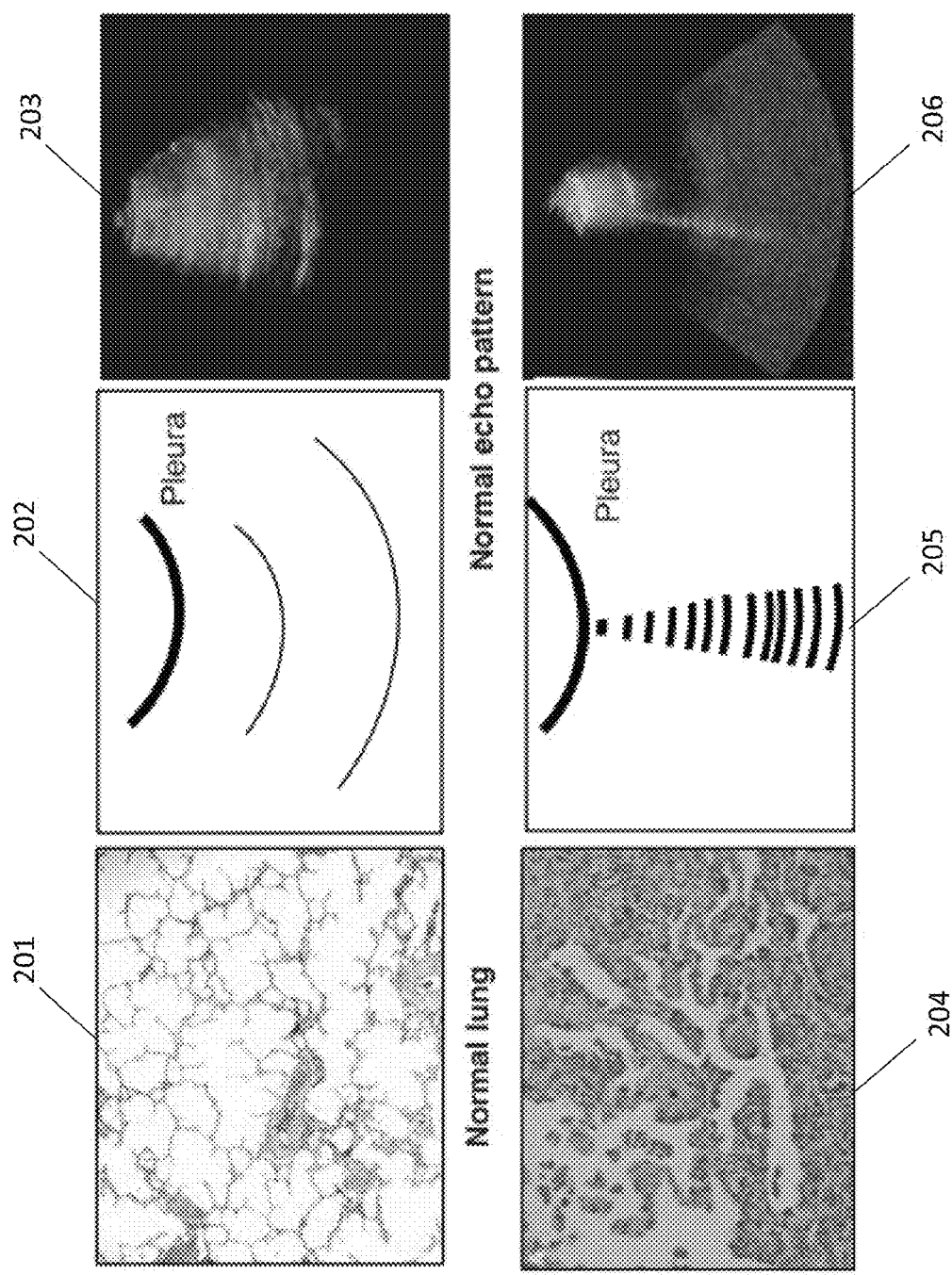
FIG. 2 depicts sonographic images of lung surfaces and figures exhibiting reflections of ultrasound beams according to an embodiment of the subject matter described herein.

At present, one typical approach of lung ultrasound is based on the identification of standardized signs. For example, pulmonary fibrosis is associated with the presence of Ultrasound Lung Comets (ULCs), or vertical artifacts called B-lines, which are echographic artifacts detectable with chest sonography. For example, FIG. 2 presents images that exhibit multiple comet tails fanning out from the lung surface. In particular, FIG. 2 depicts sonographic images of lung surfaces and illustrations exhibiting reflections of ultrasound beams according to an embodiment of the subject matter described herein. In particular, image 201 depicts a histological image of a normal lung. Further, image 202 illustrates an image of a normal echo pattern of ultrasound beams reflecting off of the pleura of a lung. Likewise, image 203 shows a corresponding sonogram image of reflection of the ultrasound beam off the pleura and exhibiting a normal echo pattern. In contrast, image 204 depicts a histological image of a pulmonary fibrotic lung. Further, image 205 depicts an image of a narrowed echo pattern of ultrasound beams reflecting off of the pleura of a fibrotic lung, exhibiting a vertical artifact. Moreover, image 206 shows a corresponding sonogram image of reflection of the ultrasound beam off the pleura and exhibiting a narrowed echo pattern. Notably, these images depict the manner of reflections of the ultrasound beams caused by thickened interlobular septa that give rise to ULCs.

In pulmonary fibrosis, ULCs or vertical artifacts may be generated by the penetration of ultrasound within thickened sub-pleural interlobular septa. However, these artifacts are highly qualitative, and reading and interpreting these signs is largely subjective and operator-dependent. In particular, these artifacts are not observed consistently, and being qualitative, the associated signs do not allow for adequate monitoring or staging.

Moreover, the quantitative tissue characterization of the lungs has remained a challenge using ultrasound techniques. The presence of air sacs make the lung a highly diffusive, aberrating, and scattering medium. In particular, the diffusive nature of the lung destroys the linear relationship between propagation time and propagation distance, thereby making imaging of the parenchyma very challenging. The disclosed subject matter is configured to leverage these large amounts of scattering.

Figure 3:
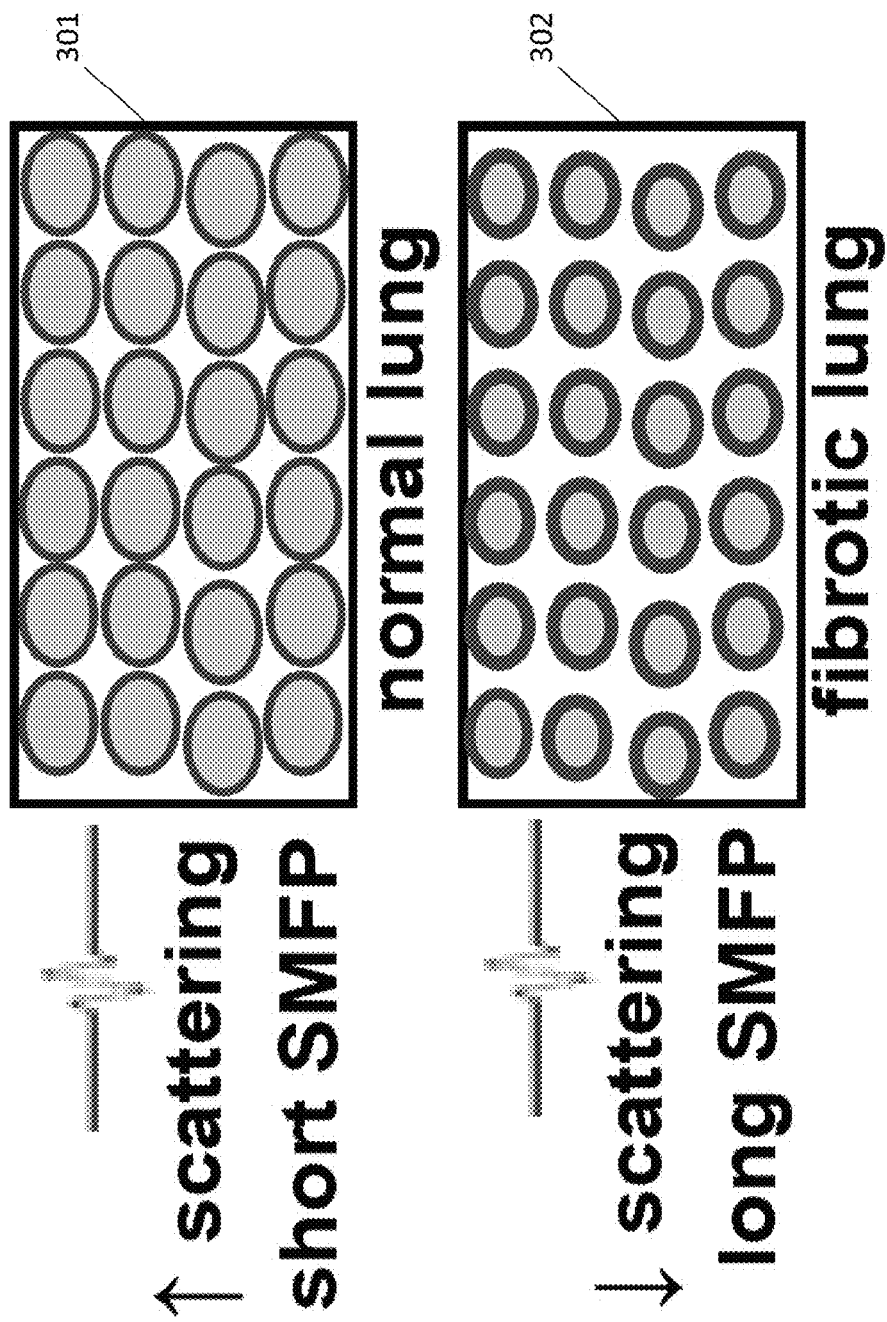
FIG. 3 depicts images contrasting the scattering of ultrasound waves in anormal lung and a fibrotic lung according to an embodiment of the subject matter described herein.

In particular, the disclosed subject matter is based on the notion that because pulmonary fibrosis is responsible for changes in the micro-architecture of the parenchyma (i.e., thickening of the alveolar walls, which reduces tissue compliance and elasticity), it can be hypothesized that multiple scattering of ultrasound waves can be used to detect and quantify these physical changes. In a fibrotic lung, alveolar wall thickening and a reduced amount of air will lead to a reduced number of scattering events. Notably, the resulting reduction of scattering events can be detected and quantified by the disclosed systems and methods. For example, the disclosed approach relies on the measurement of the scattering mean free path (SMFP), which can be described as the mean distance between scattering events. The SMFP is related to the transport mean free path, and may be equal to the transport mean free path for lung alveoli in the MHz range. In a healthy and normal lung, the millions of air-filled alveoli are responsible for frequent scattering events, leading to short SMFPs. In contrast, in instances involving pulmonary fibrosis, due to reduced volume of air and the increased volume of tissue, less scattering should be observed. Therefore, the SMFP is expected to be significantly longer in fibrotic lungs as compared to normal lungs. For example, FIG. 3 depicts images contrasting the spacing between scatterers in a normal lung and a fibrotic lung according to an embodiment of the subject matter described herein. In particular, the blue circles represent air filled alveoli. In image 301, an ultrasound wave that enters a normal lung experiences multiple scatters, there by SMFP is short. in contrast, image 302 depicts a fibrotic lung which have smaller alveoli, thicker alveolar walls, and more tissue present between alveoli. as a result, the distance between scatterers is longer in the compromised lung.

Bleomycin Rat Model

In some example studies, pulmonary fibrosis was created in Sprague-Dawley rats by instilling bleomycin into the airway. After sedation, the rats were intubated with a 12-gauge catheter. In particular, bleomycin 2 mg/kg, dissolved in 100 µl sterile PBS, was administered into the trachea. The rat was subsequently extubated and allowed to recover. The bleomycin typically causes development of pulmonary fibrosis within 2-3 weeks. The rats were studied in groups of six (e.g., n=6; 3 male and 3 female) at 2 weeks, 3 weeks, and 4 weeks after the bleomycin administration in order to create a range of severity of pulmonary fibrosis for assessment. Further, six additional rats (3 male, 3 female) who received no treatment served as controls.

Animal Preparation for Ultrasound

A total of twenty-four (24) Sprague Dawley rats (i.e., 12 male and 12 female) were used in one example study (349±91.76 grams). After sedation, a tracheotomy was performed on each of the rat subjects. Further, the rats were each ventilated with a Harvard rodent ventilator administered/maintained with anesthesia using titrated isoflurane. A sternotomy was performed such that the pleural spaces were opened and the sternal edges spread maximally to expose both lungs. This procedure was required for the rat because the intercostal space in each of the subjects is not large enough to fit an ultrasound probe. In human applications, the process will be a completely non-invasive procedure, such that the probe can be placed at multiple intercostal spaces. In embodiments utilizing an ultrasound probe, a probe holder device may be utilized. Notably, in order to ensure that a consistent angle is maintained between the probe and the pleural surface of the lungs, a probe holder device may be used for the ultrasound probe.

In rat subjects, the incision was extended inferiorly into the abdomen to expose the liver. Heparin was administered intrahepatically to prevent clotting after the lungs were removed from the rat subjects. For the ultrasound measurements, ultrasound coupling gel may be applied directly onto each lung in rodents. In human subjects, ultrasound coupling gel would be applied externally, on the surface of the skin. Ultrasound measurements were taken in rat lungs in vivo (described below). After the ultrasound data was collected, the rat was euthanized by cardiectomy under anesthesia. Further, the trachea of each rat was clamped at end-inspiration and the heart-lung block was excised. The heart-lung block was subsequently immersed in cold phosphate buffered saline (PBS) for an ex-vivo CT scan (as described below). Following the CT scan, the heart-lung block may be subjected to inflation fixation for histologic interpretation (as described below).

Data Acquisition Methodology

In some embodiments, the in-vivo experiments may be conducted with a linear array transducer coupled to an ultrasound scanner device. For example, in some instances, a 128 element Linear Array Transducer (e.g., Verasonics L11-4v) connected to a Verasonics Vantage ultrasound scanner. For each animal subject, 10 ultrasound data sets were acquired in order to assess repeatability and reproducibility. The transducer may be placed on the exposed lung using an approximately 2 millimeter layer of coupling gel. All of the elements of the linear array transducer can be fired one by one, transmitting a two cycle pulse with a central frequency of 7.8 MHz (300 kPa in water) into the medium. For each transmit, the backscattered signals may be collected on all 128 elements of the array. This manner of transmission and signal collection affords access to the spatial spread of the transient pressure field. In some embodiments, the sampling frequency of the data acquired was 62.5 MHz and the total data acquisition time was set to 40 microseconds (μs). This combination of sampling frequency enabled the acquisition of a 128 by 128 by 2500 inter-element response matrix (IRM) H(t) whose individual elements $h_{ij}(i)$ are the $N^2$ impulse responses of the medium. Moreover, H(t) can then be processed using the methodology described by Tourin et al. and Aubry et al. (Aubry and Derode 2007; Tourin et al. 2000). In the interest of clarity and simplicity, the origin time (t=0) may be set to the arrival of the first backscattered wave for every single receiving transducer element. Further, the IRM's reciprocity feature can be configured to generate an anti-IRM represented by $H^A(t)$. This may be accomplished using a simple matrix manipulation as shown below:

for i>j, $h_{ij}{}^A = -h_{ij}$;
for i=j, $h_{ii}{}^A = 0$;
for $h_{ij}{}^A = h_{ij}$;

In some embodiments, matrices H(t) and $H^A(t)$ can then be processed to obtain D from the incoherent intensity ($I_{inc}$). Analytically, the incoherent intensity can be represented in Equation (1) as follows:

$$I_{inc}(X, T) = I(T)\exp\left(-\frac{X^2}{4DT}\right)$$

In this Equation (1), X represents the distance between emitter and receiver and D represents the Diffusion constant, which is an indicator of the diffusivity of the multiple scattering medium, and related to the transport mean free path and scattering mean free path. Equation (1) clearly establishes that D can be retrieved by plotting the incoherent intensity as a function of X and T. For example, the incoherent intensity can be averaged over multiple emitter receiver couples separated by the same distance. At each time window, the backscattered incoherent intensity can be fitted with a Gaussian curve and the variance of the Gaussian fit may represent the dynamic growth of the diffusive halo given by ($W^2(T) = 2DT$). Once D is extracted, the transport mean free path L* can be evaluated and/or determined based on Equation (2) as follows:

$$D = \frac{V_E \times L^*}{3}$$

High Resolution CT Scanning and Scoring

It should be noted that the operation of the disclosed subject matter can be validated using a number of techniques. These techniques may involve acquiring an independent measurement of fibrosis present in a lung that can be used to obtain a ground truth value/measurement. Notably, the ground truth measurement can then be used to compare the results obtained by the disclosed subject matter.

In one such example, high resolution CT scanning and scoring methods may be used. For example, in order to optimize the resolution, ex vivo high resolution CT scans can be obtained and/or performed as opposed to imaging lungs in a live, sedated, breathing animal subject. For example, a high resolution preclinical CT system (CT 120, TriFoil Imaging, Inc. Chattsworth, Calif.) can be used to acquire micro-CT images on lung specimens. The entire lung can be removed from deceased rats, inflated, and closed at the airway. In some embodiments, images can be immediately taken after lung collection with x-ray energy of 100 kVp, a current of 50 mA, 100 ms of exposure time, and 2×2 binning.

In some embodiments, images were reconstructed using a Feldkamp reconstruction algorithm in order to create isotropical CT images with a nominal resolution of 50 μm. Final images were converted to a DICOM format as measured in Hounsfield units (HUs). Prior to imaging, the lung block can be inflated manually with air via syringe to a volume that visually approximates the volume of the lung block at end-inspiration when the lung block was removed. It is understood that compliance will differ for each lung block, depending on the amount and/or degree of fibrosis present. Inflation at the imaging facility to a particular inspiratory pressure or precise volume is not possible. In particular, lung block volume can change because lung cells remain viable for hours after circulatory arrest, so oxygen consumption is ongoing. With a respiratory quotient of 0.8 (e.g., CO2 production to O2 consumption), the volume of air in the lung block will diminish with time, so inflation is required. Imaging can be taken within 10 minutes of inflation for all the specimens.

In some embodiments, the severity of lung fibrosis can be scored between 0-4 based on a visual assessment of fibrotic tissue volume. The severity may be based on the Ashcroft scale, with a severity score of '0' representing no fibrosis, '1' representing small local fibrosis affecting less than 15% lung volume, '2' representing local medium fibrosis affecting up to quarter of lung volume, '3' representing large amounts of fibrotic tissue affecting up to 50% lung volume, and '4' representing diffusive fibrosis affecting multiple lung lobes with more than 50% lung volume.

Histology and Scoring

After each CT scan, the lung blocks can be subjected to inflation-fixation. In some embodiments, lung blocks may be submerged in a paraformaldehyde solution for 24-48 hours, then washed and stored in 70% ethanol. A paraffin section of lung, stained either by Hematoxylin and Eosin (e.g., 5 micron sections stained with H&E) or by a trichrome method, is systematically scanned using a microscope with a 10× magnification. Each successive field may be individually assessed for severity of interstitial fibrosis. Moreover, severity of lung fibrosis may be studied on the Ashcroft scale (0-8 scaling). After examining the whole section, a mean score of all the fields can be taken and/or recorded as the fibrosis histology score for the lung section. In some instances, a veterinary lung pathologist can be tasked to provide a qualitative score based on the alveolar wall thickness in a masked manner.

Data Analysis and Statistical Methods

In some embodiments, the diffusion constant was calculated from IRM acquisitions. Differences between $L^*$ values obtained from control lungs and fibrotic lungs were tested using the Kruskal-Wallis test with Dunn's post-test. In some examples, data was not normally distributed, so non-parametric analysis was chosen. Further, all data are presented as mean±standard deviation and statistical significance was set a priori at $p<0.05$ and is graphically depicted on all figures as (*) for $p<0.05$, () for $p<0.01$ and (*) for $p<0.001$. Further, 'NS' may denote non-statistically significant comparisons. In some instances, statistics can be performed in MatLab 2018a.

Due to the low penetration in control rat lungs, only the first portion of the variance plots as a function of time are selected to calculate the Diffusion Constant, D. This may be automated using the findchangepoints command in MatLab.

Results

Figure 4:
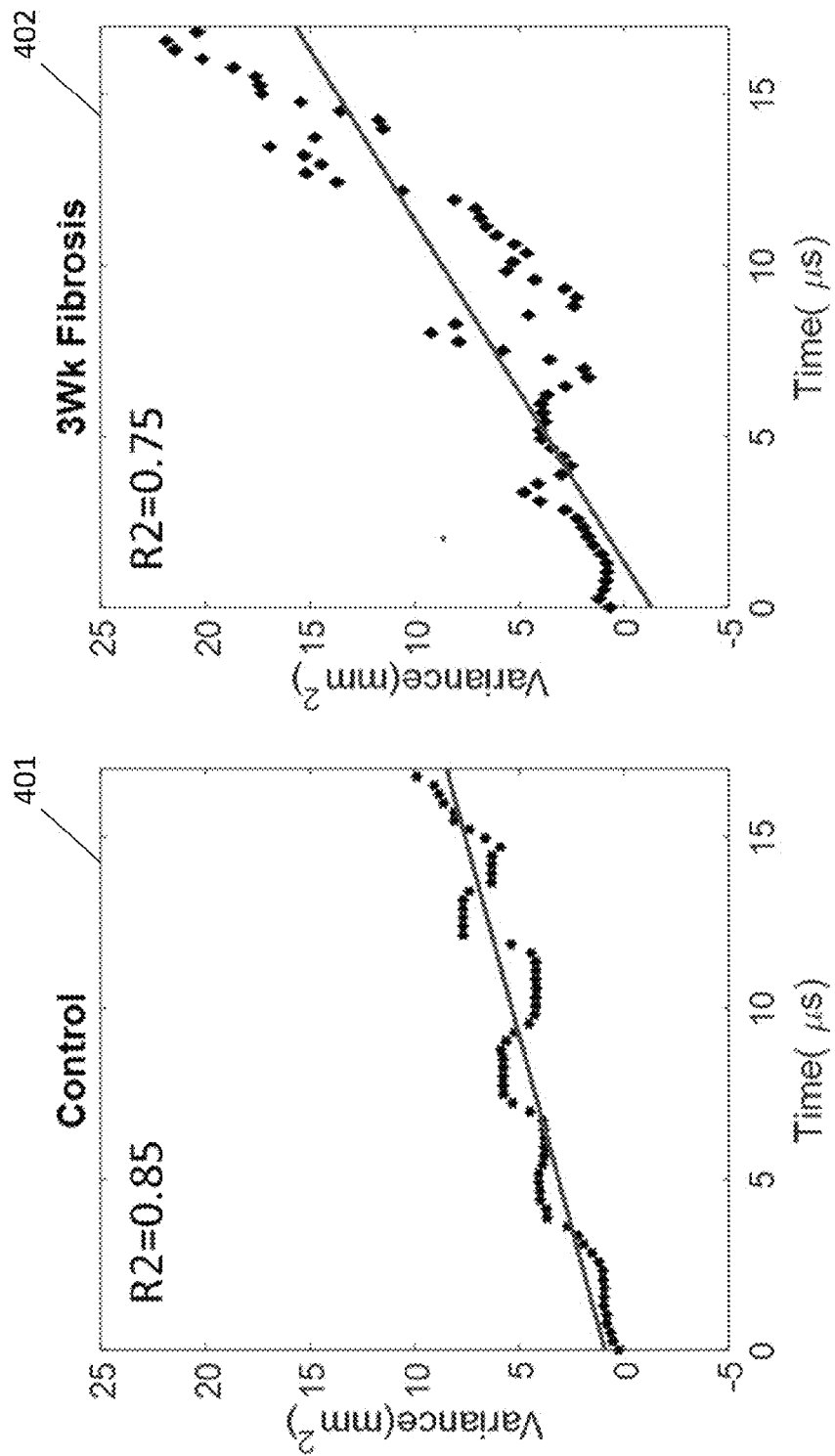
FIG. 4 illustrates exemplary variance plots respectively associated with a control lung and a fibrotic lung according to an embodiment of the subject matter described herein.

FIG. 4 illustrates exemplary variance plots respectively associated with a control lung and a fibrotic lung according to an embodiment of the subject matter described herein. More specifically, FIG. 4 shows examples of the variance plots obtained for a control lung (plot 401) and a 3 week fibrotic lung (plot 402). For the 3 week fibrosis case shown in plot 402, the variance increases more rapidly than for the control case as depicted in plot 401. This behavior can be attributed to the thickened alveolar interstitial spaces, which effectively increase the distance between air scatterers, thereby allowing the ultrasound wave to diffuse more freely. In the case of the control rat lungs, the growth of the diffusive halo is highly restricted due to the large air volume present in the lungs.

Figure 5:
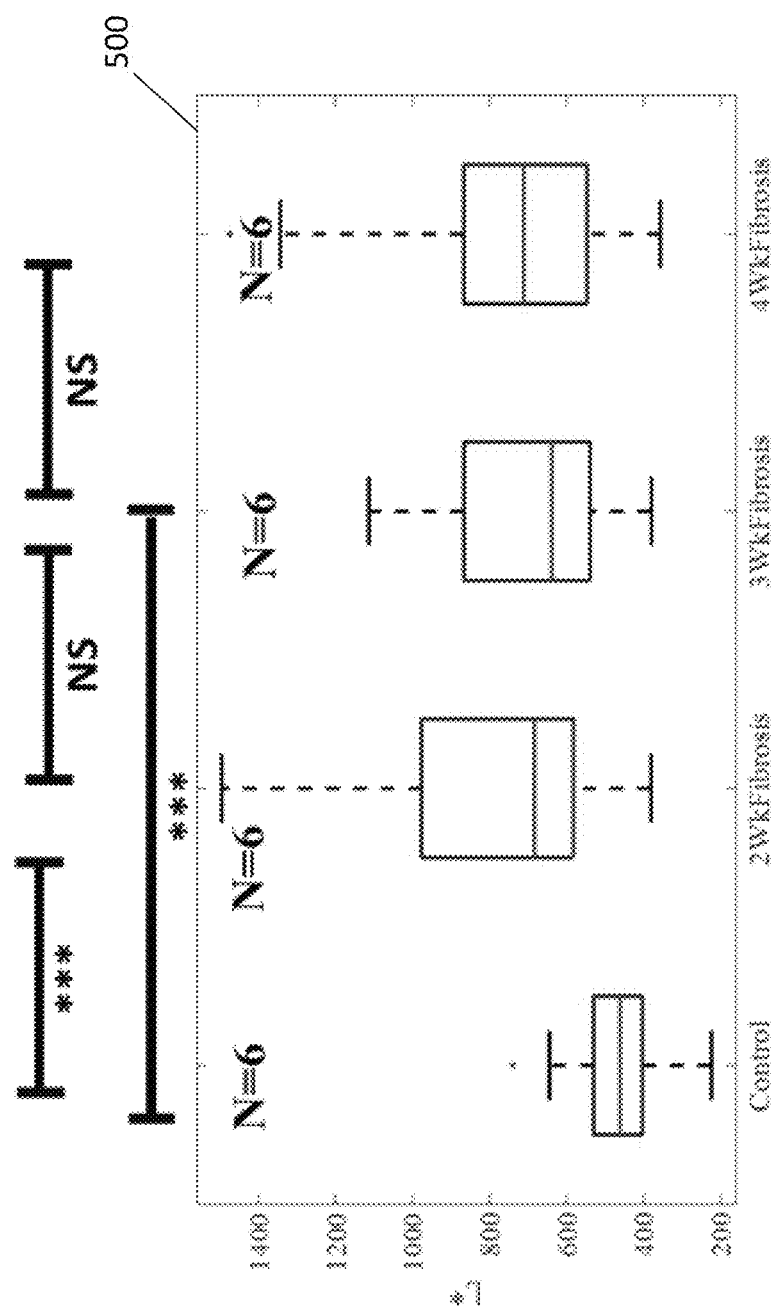
FIG. 5 illustrates an exemplary graph depicting the distributions of the transport mean free path values obtained in control and fibrotic lungs according to an embodiment of the subject matter described herein.

FIG. 5 illustrates an exemplary graph depicting the distributions of the transport mean free path values obtained in control and fibrotic lungs according to an embodiment of the subject matter described herein. More specifically, graph 500 in FIG. 5 shows distributions of $L^*$ values obtained in control lungs and various fibrotic lungs. Namely, the fibrotic lungs used for measurements in graph 500 pertain to 2 weeks, 3 weeks, and 4 weeks after bleomycin inhalation. Differentiation between control lungs and fibrosis lungs (2 Wk, 3 Wk and 4 Wk) can be achieved with high statistical significance. The $L^*$ values for control lungs, 2 week fibrosis lungs, 3 week fibrosis lungs, and 4 week fibrosis lungs were found to be 466±109 773±304 690±191 and 729±245 µm respectively.

Figure 6:
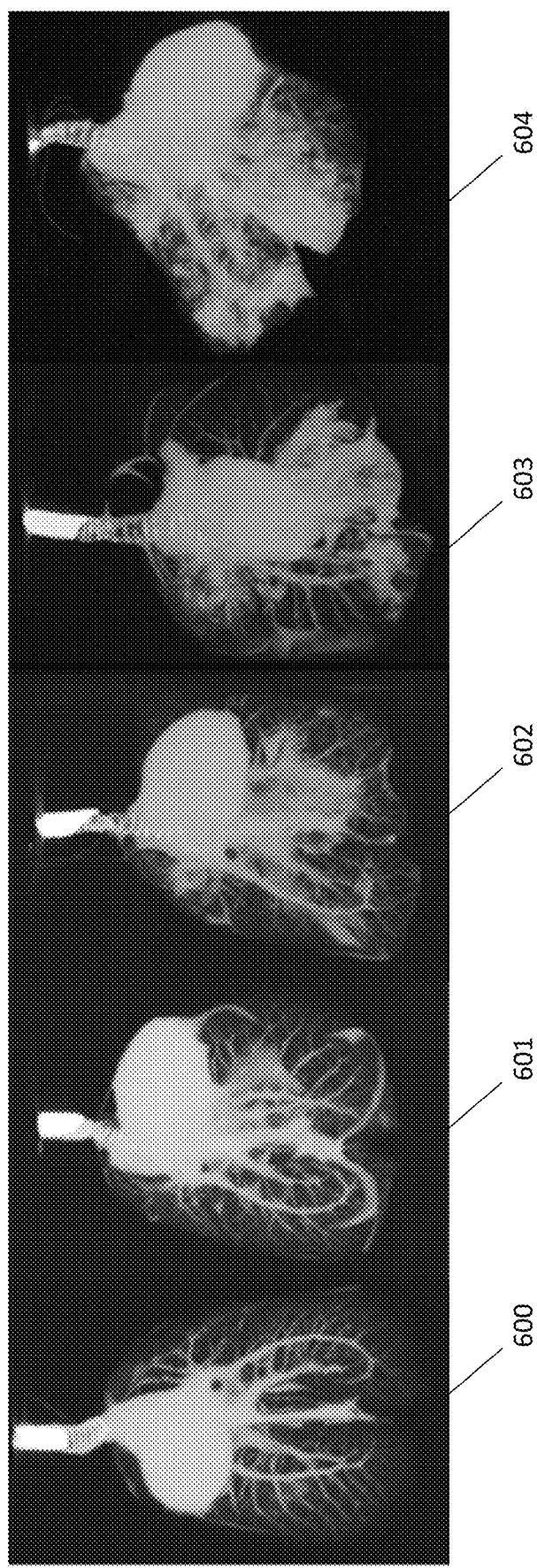
FIG. 6 depicts exemplary computed tomography (CT) images and corresponding severity scores according to an embodiment of the subject matter described herein.
Figure 7:
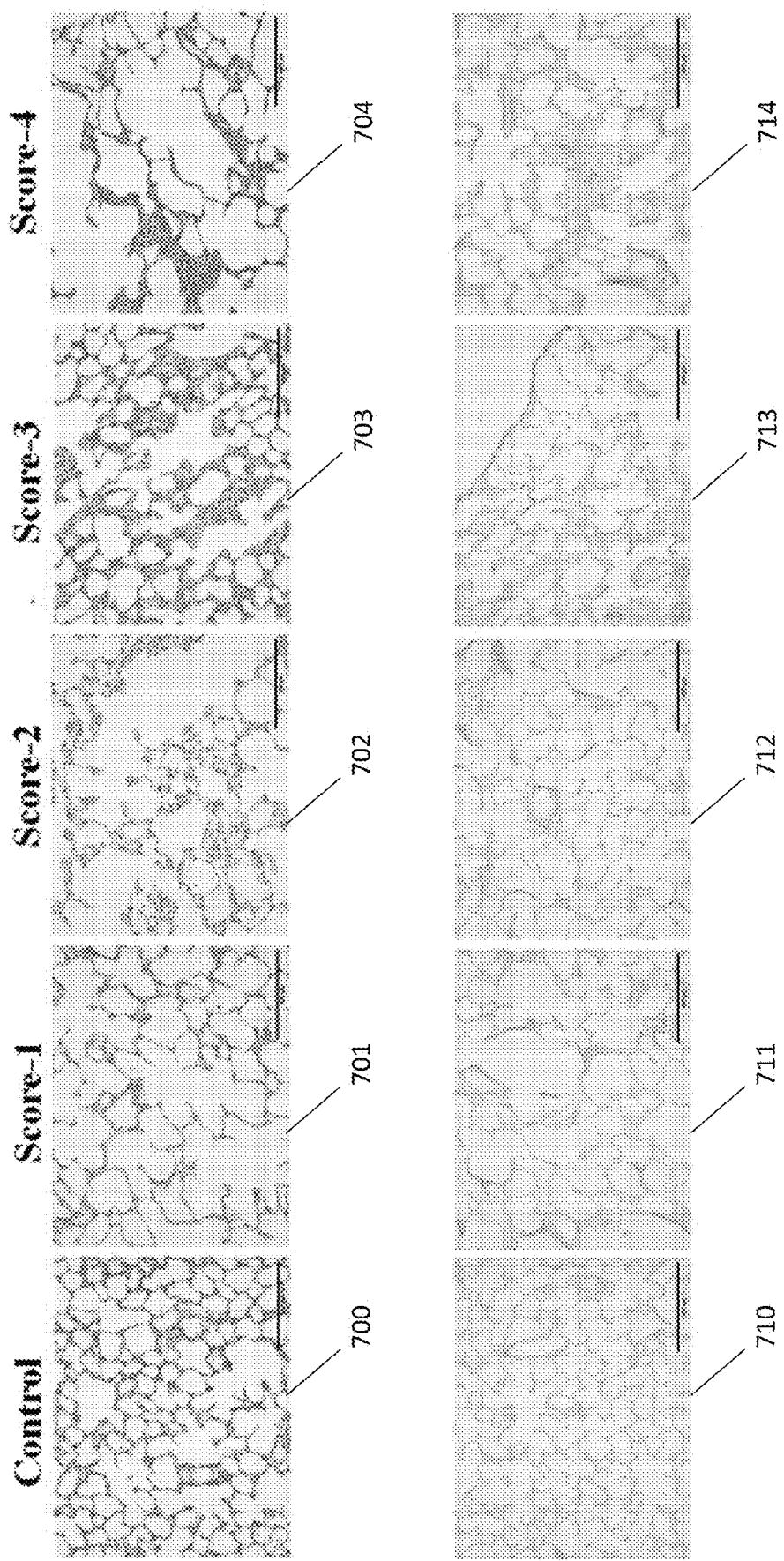
FIG. 7 depicts exemplary histology images and corresponding severity scores according to an embodiment of the subject matter described herein.

In order to validate the ultrasound results, it is important to analyze the CT and histology scores. FIGS. 6 and 7 respectively depict exemplary computed tomography (CT) images and histology images along with their corresponding severity scores according to an embodiment of the subject matter described herein. For example, FIG. 6 and FIG. 7 respectively depict examples of CT and histology images that were used to estimate fibrosis severity scores. As fibrosis progresses, the tissue starts thickening which can be observed in histology images 700-714 in FIG. 7 as well as the CT images 600-604 in FIG. 6. For example, at severity score 4 as shown in CT image 604, higher shades of gray, which reflect thickened septa, can be observed. This is corroborated by histology images (e.g., image 704 and/or image 714).

Figure 8:
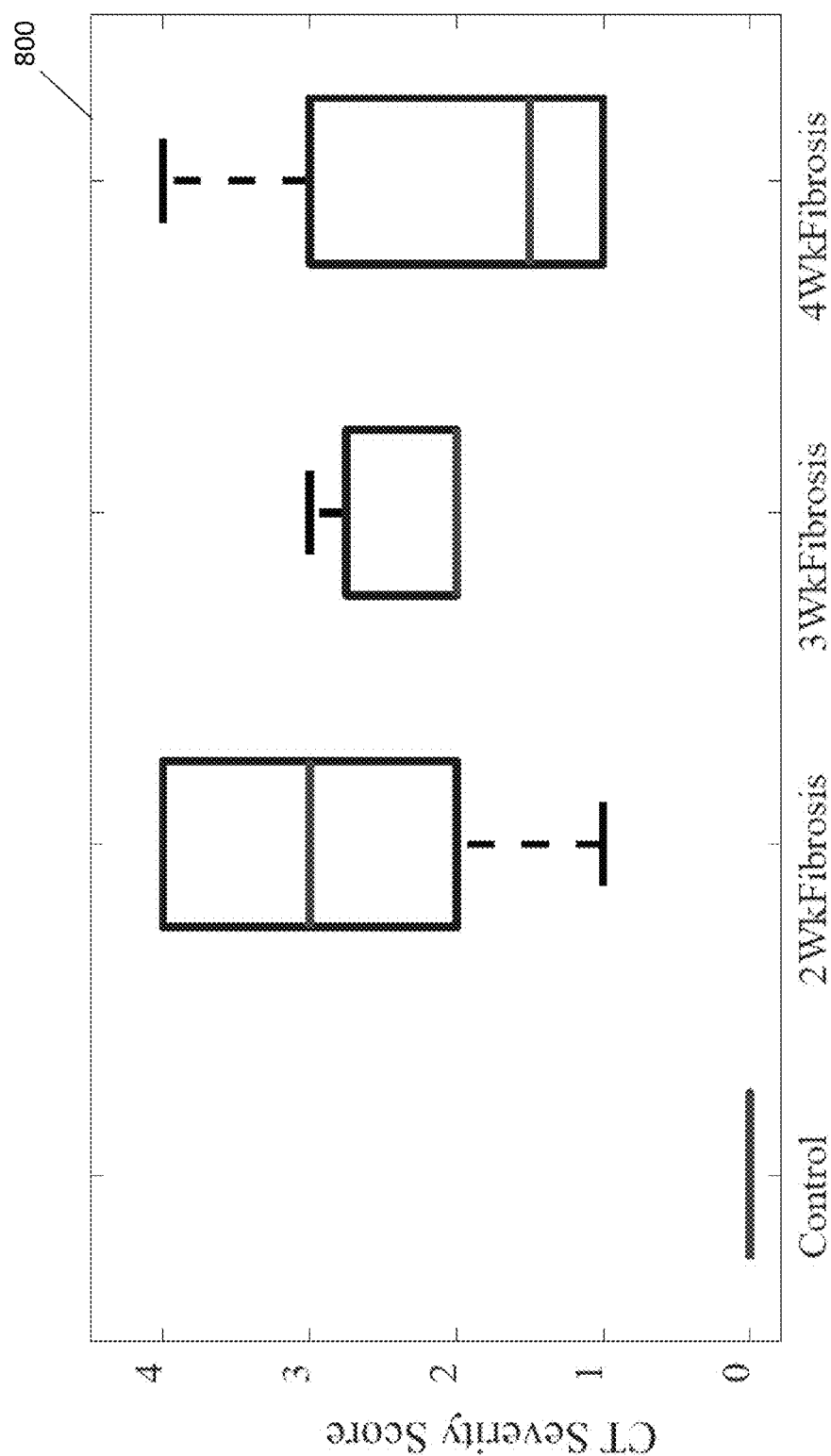
FIG. 8 illustrates an exemplary graph depicting computed tomography (CT) severity scores based on bleomycin administration time in animal subjects according to an embodiment of the subject matter described herein.
Figure 9:
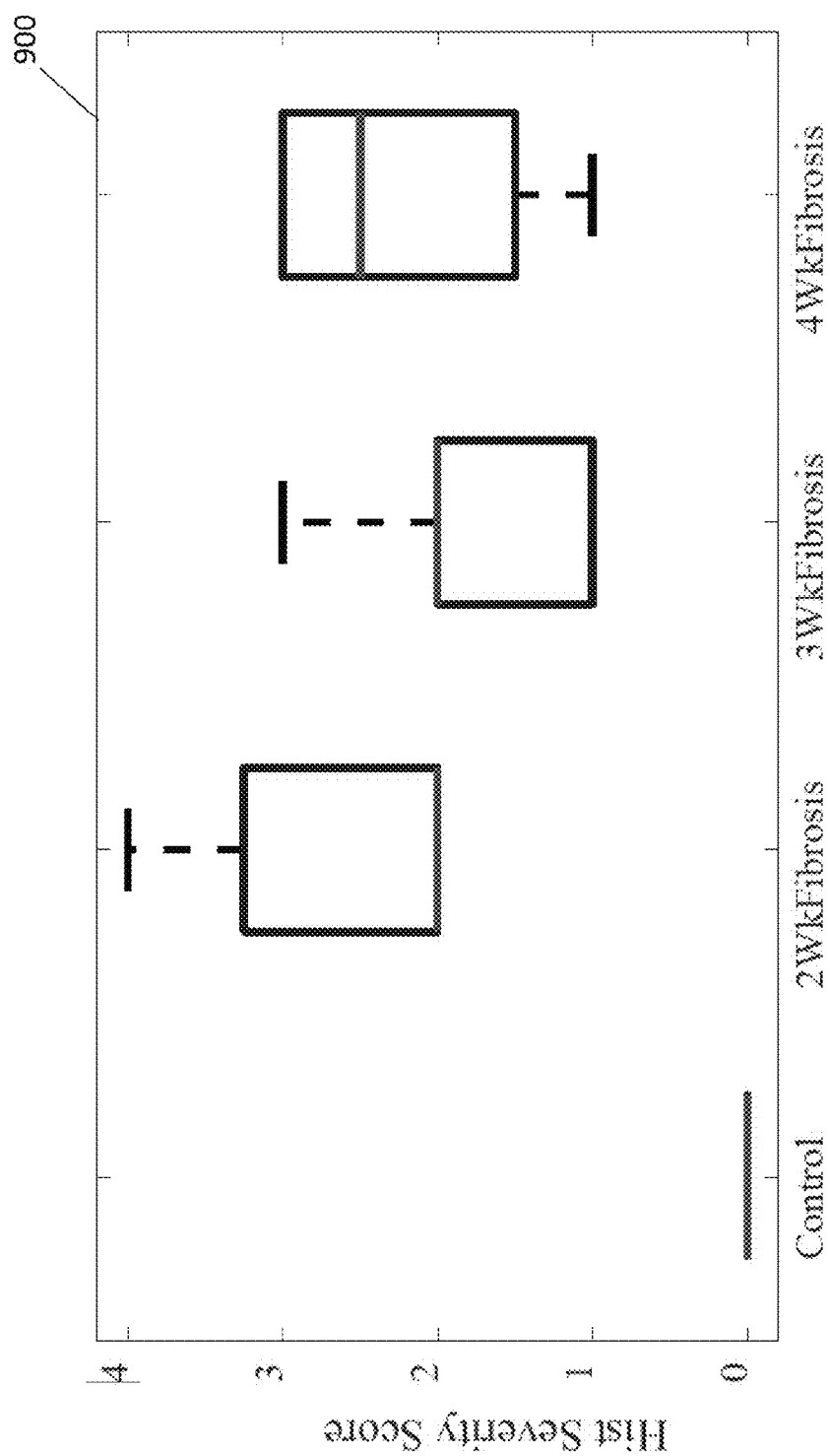
FIG. 9 illustrates an exemplary graph depicting exemplary histology severity scores based on bleomycin administration time in animal subjects according to an embodiment of the subject matter described herein.

Shown in FIG. 8 and FIG. 9 are the distributions for the fibrosis severity score for the control lung, week 2 fibrosis lung, week 3 fibrosis lung, and week 4 fibrosis lung obtained from the CT and histology images of FIGS. 6 and 7, respectively. As shown in graphs 800 and 900 in FIGS. 8 and 9, the maximum amount of fibrosis may occur after 2 weeks of a bleomycin treatment. After which, fibrosis begins to subside and is at its minimum severity at 4 weeks according to the CT related graph 800. Moreover, histology graph 900 similarly supports the claim that fibrosis severity peaks after 2 weeks of bleomycin administration. Shown in Table 1 below are the average severity scores obtained from histology and CT assessments. It is appreciated that the values in Table 1 may not necessarily be able to be averaged, but rather represent a classification (e.g., A, B, C, and D).

TABLE 1

| Rat Type | CT Score | Histology Score |
| --- | --- | --- |
| Control | 0 | 0 |
| 2 Wk | 2.8 | 2.6 |
| 3 Wk | 2.2 | 1.8 |
| 4 Wk | 2 | 2.25 |

Figure 10:
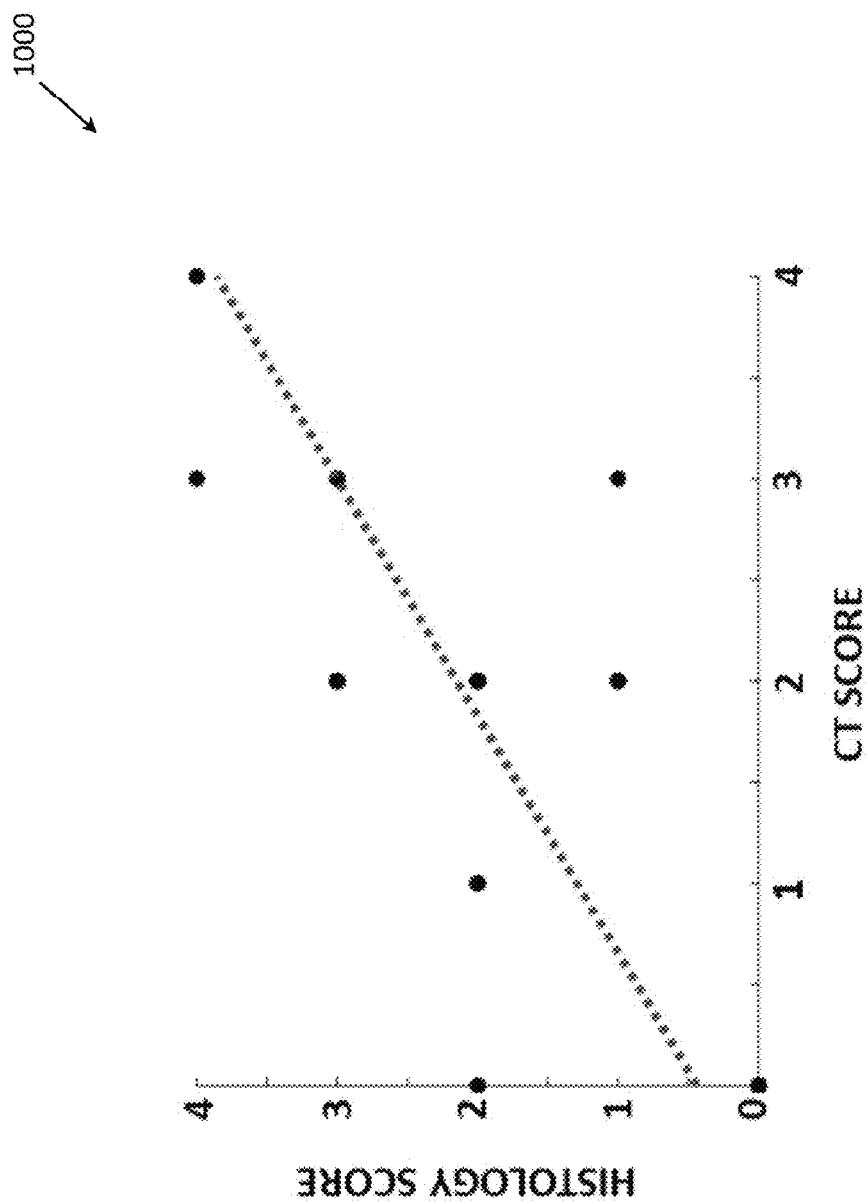
FIG. 10 depicts an exemplary plot graph that compares histology and CT severity scores according to an embodiment of the subject matter described herein.

In some embodiments, it can be hypothesized that the bleomycin model is not a permanent model for inducing fibrosis in the rodent specimen. The bleomycin rodent model attains its peak fibrosis at 2 weeks and eventually starts subsiding. The masked CT and histology severity scores were also compared to determine if both methodologies quantified pulmonary fibrosis in a similar manner. Shown in FIG. 10 is the comparison between CT and histology scores. In particular, FIG. 10 depicts an exemplary plot graph 1000 that compares histology and CT severity scores according to an embodiment of the subject matter described herein. Notably, the trend between the CT severity and histology severity score is a positive and significant one, with $p<0.05$, thereby strengthening the confidence in the results.

Figure 11:
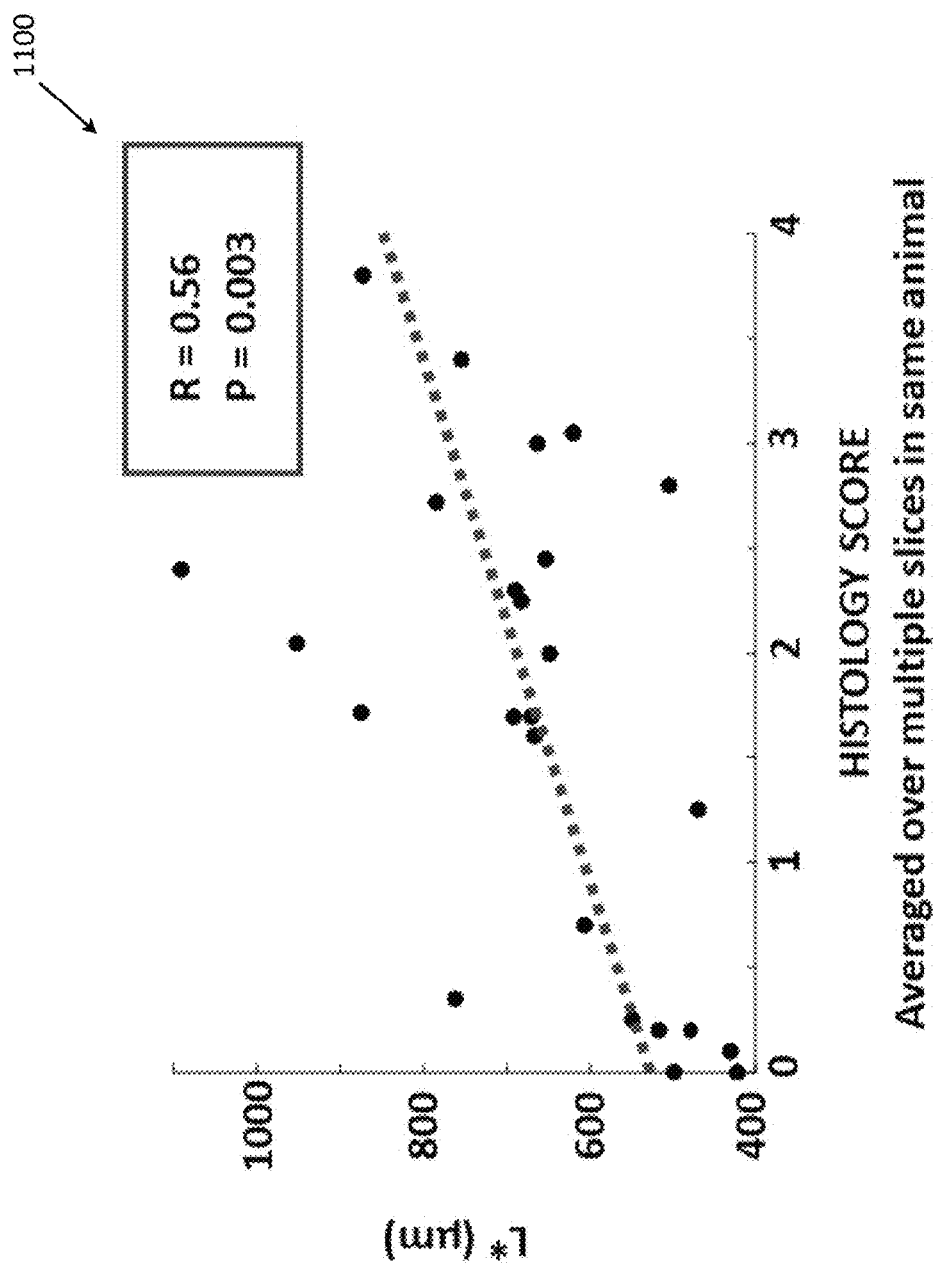
FIG. 11 depicts an exemplary plot graph comparing histology severity scores and transport mean free path values according to an embodiment of the subject matter described herein.

FIG. 11 depicts an exemplary plot graph comparing histology severity scores and transport mean free path values according to an embodiment of the subject matter described herein. In particular, the $L^*$ values were compared with histology scores as shown in graph 1100, such that the transport mean free path $L^*$ has a positive and significant ($p=0.03$) correlation with the histology severity scores.

4. Impact

It has been successfully demonstrated that for a lung of a Sprague-Dawley rat, the transport mean free path is able to differentiate between a control lung specimen and a fibrosis lung specimen. For example, transport mean free path, L*, can be obtained by separating the coherent and incoherent backscattered intensities and calculating D, which represents the dynamic growth of the diffusive halo. Notably, L* is a representation of how an ultrasound wave diffuses in the lung parenchyma. In control lungs, due to the large amounts of air scatterers and large air volume contained within, the growth of the diffusive halo is restricted, thereby leading to low L* values. In contrast, in fibrotic rat lung specimens, the extensive thickening of the interlobular septa allows for the wave to diffuse freely in lung parenchyma, thus accentuating the value of L* and the diffusion constant D.

It is further determined that there is a good correlation between SMFP and degree of fibrosis on CT scans as well as the degree of fibrosis assessed by histology. Both assessments (i.e., CT and histology) were conducted by independent experts who were not aware of the SMFP measurements. To ensure that each expert knew what a normal lung looked like, three (3) control specimens were identified for each expert. The other 3 normal lungs were not identified, but were scored "0" by each expert. No fibrotic lung was assigned a score of zero by any expert. The data further implies that the severity of fibrosis as assessed radiographically and by histology was very similar.

This suggests the potential of using transport parameters to detect and stage lung pathologies such as pulmonary fibrosis, allowing monitoring response to treatment.

Figure 12:
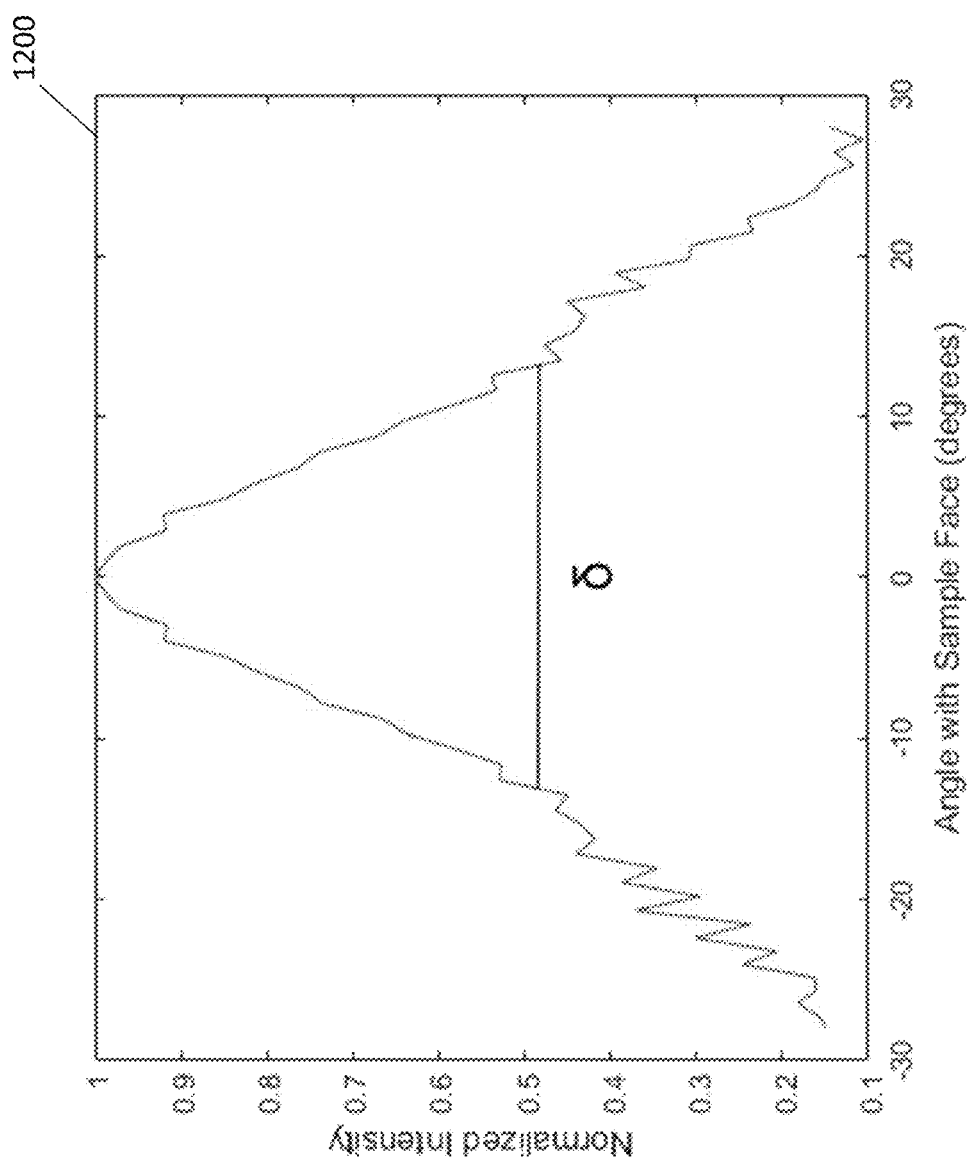
FIG. 12 depicts an exemplary plot graph that a coherent intensity peak for a single time window according to an embodiment of the subject matter described herein.

In some embodiments, the disclosed subject matter may utilize coherent intensities as opposed to incoherent intensities. Notably, coherent intensities cannot be used in the near field (i.e., the probe will have to move slightly away from the parenchyma). In some embodiments, the underlying principle of the corresponding algorithm fits the coherent peak with a Gaussian curve for each time window of a coherent intensity matrix. Once the standard deviation for each Gaussian fit is stored, these standard deviations can be used to calculate the full width at half maximum via the equation, $$\delta = 2\sqrt{2\ln 2}\sigma = 2.355\sigma$$

where $\delta$ is the full width shown in in graph 1200 of FIG. 12 at half maximum and $\sigma$ is the standard deviation.

Figure 13:
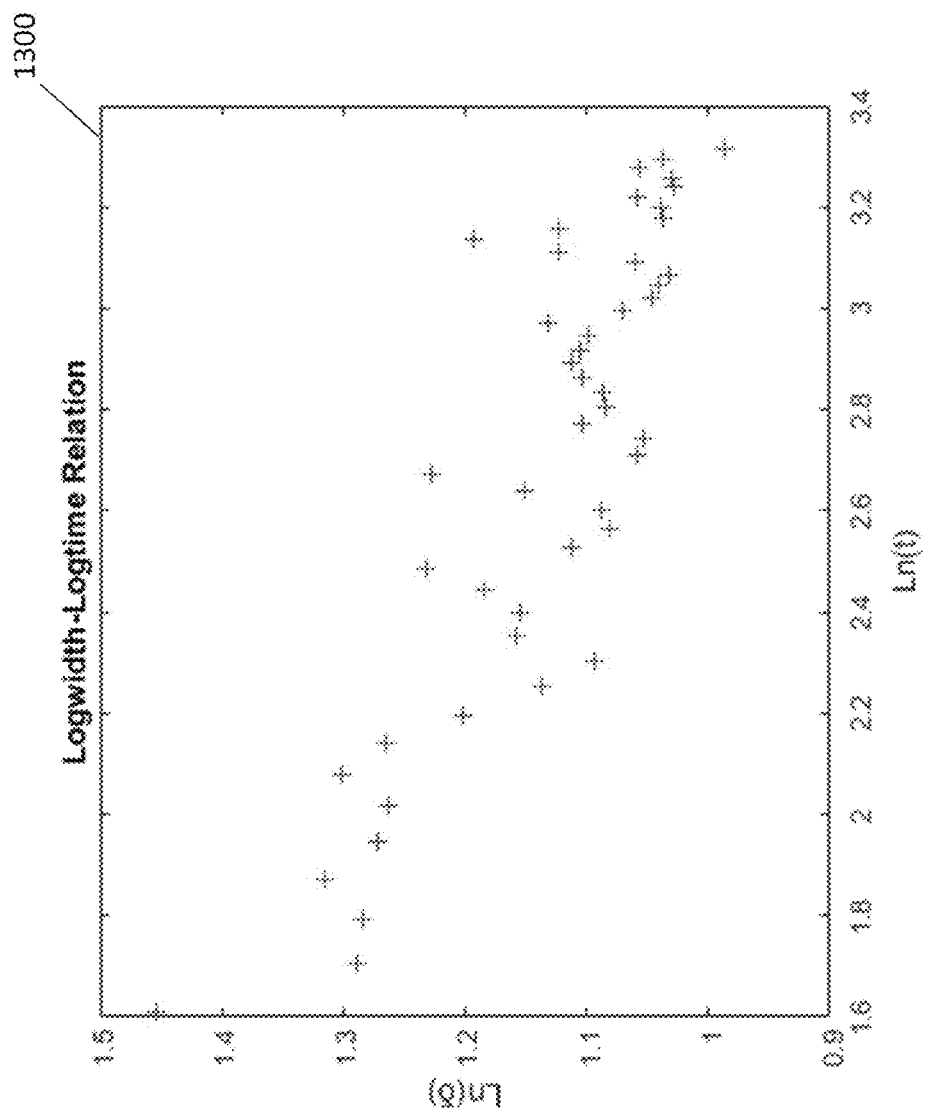
FIG. 13 depicts an exemplary plot graph depicting the log-log representation of the narrowing of the coherent intensity peak with time according to an embodiment of the subject matter described herein.

The natural logarithm of the widths can then be plotted against the natural logarithm of each time window, as shown in graph 1300 of FIG. 13. While the coherent peak contains an ensemble average of only three measurements, there is still a fairly noticeable negative correlation in the data as could be predicted: the coherent peak narrows over time. A linear fit of these points provides an estimate of the log-width intercept. From this intercept, the diffusion constant may be found through the equation, $$\ln \delta = 1.12 \frac{1}{k\sqrt{D\ln t}}$$

where k is the wavenumber of the emitted wave. Along with each linear fit, the 95% confidence interval of each intercept calculation was stored in order to provide a level of uncertainty in each measurement.

Figure 14:
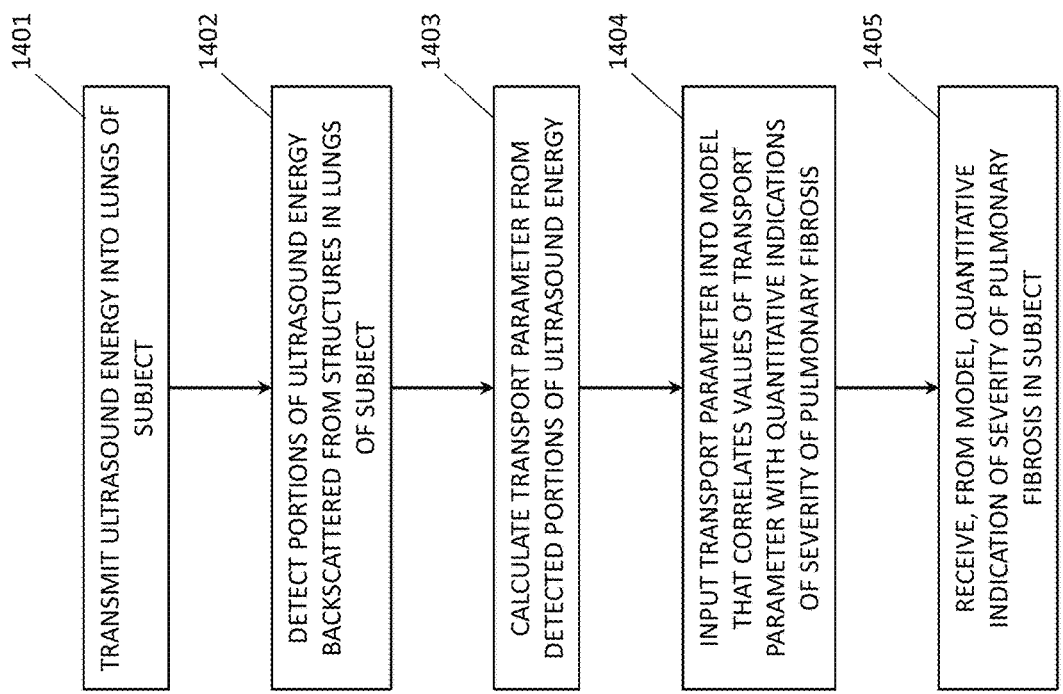
FIG. 14 is a flow chart illustrating an exemplary process for utilizing ultrasound multiple scattering to assess pulmonary fibrosis according to an embodiment of the subject matter described herein.

Although the above disclosure describes the use and testing of rat lung specimens, it is understood that the disclosed systems and methods may also be used to assess and monitor pulmonary fibrosis in human lungs and other animal specimen lungs without departing from the scope of the disclosed subject matter. For example, FIG. 14 illustrates an exemplary process 1400 for quantifying the severity of pulmonary fibrosis that may be used in human subjects according to an aspect of the subject matter described herein. In some embodiments, process 1400 may be a software algorithm or method (e.g., pulmonary severity assessment engine) that is stored in memory and executed by one or more processors of a computing device or system (e.g., ultrasound system 1 in FIG. 1). In some embodiments, process 1400 may be developed for use on and/or with a portable ultrasound probe device. It will be appreciated that exemplary process 1400 is for illustrative purposes only and that different and/or additional actions may be used. It will also be appreciated that various actions associated with exemplary process 1400 may occur in a different order or sequence.

Referring to FIG. 14, in step 1401, the process includes transmitting ultrasound energy into the lungs of a subject (e.g., a human patient). For example, as described above, ultrasound pulses may be transmitted into the lungs of a subject using a multi-element ultrasound linear, curved, endocavitary, ultraportable, or phased array transducer, or any type of matrix transducer, where the elements or groups of elements are fired successively in order to transmit ultrasound energy into the human subject's lungs. In some embodiments, beamforming methods may be used to create virtual sources at the pleural surface. In such a scenario, the individual transducer elements of the ultrasound array may not necessarily be fired individually, but in groups of elements. In an alternate implementation, an ultrasound emitter and receiver pair placed on a three dimensional (3D) translation stage can be used to transmit the ultrasound energy and detect the backscattered ultrasound energy. The distances between the emitter and receiver can be changed for successive measurements to change the distance between the transmit and receive of ultrasound energy.

In step 1402, the process includes detecting portions of the ultrasound energy backscattered by structures in the lungs of the subject. As described above, when one ultrasound transducer element transmits, the remaining transducer elements receive ultrasound energy backscattered from the lungs of the subject. In an alternate embodiment, elements of an ultrasound transducer separate from the transmitting transducer may be used to detect the backscattered ultrasound energy.

In step 1403, the process includes calculating a transport parameter, from the detected portions of the ultrasound energy backscattered by the structures in the lungs of the subject. The transport parameter can be the transport mean free path or the diffusion constant. In some embodiments, the transport parameter is the scattered transport mean free path. As illustrated by Equation 1 presented above, the incoherent intensity can be determined from the impulse response matrix generated from the backscattered ultrasound signals. Alternatively, as described above (instead of the incoherent intensity), the coherent intensity can be determined. More specifically, a coherent intensity peak can be fitted with a Gaussian curve for each time window of the coherent intensity matrix. Once either the incoherent intensity or coherent intensity is determined, the diffusion constant can be determined as indicated above. From the diffusion constant, the transport mean free path can be determined using Equation (2) specified above. In an alternate implementation, the diffusion constant may be used as the indication of distances between scattering structures without calculating the transport mean free path.

In step 1404, the process includes inputting the transport parameter into a model that correlates values of the transport parameter with quantitative indications of the severity of pulmonary fibrosis. For example, the value of the transport parameter obtained in step 1403 can be used as input into a model that correlates values of the transport parameter with quantitative indications of severity of pulmonary fibrosis obtained from a statistical study where ultrasound-derived measurements of the transport parameter are correlated with degrees of severity of pulmonary fibrosis obtained from non-ultrasound sources, such as CT scanning or histological measurements, or measurements of lung function. In some studies indicated above, pulmonary fibrosis scores from high-resolution CT scanning and histological studies are correlated with corresponding transport mean free path measurements are presented.

The correlations generated from this or a similar study can be used to generate a model that receives, as input, an ultrasound backscattered energy derived transport parameter from a subject with an unknown degree of severity of pulmonary fibrosis and that outputs a score indicative of the severity of pulmonary fibrosis statistically likely to be present in the subject. Such a model can be generated using the methodology set forth in above, either using statistical tools, or using a neural network trained using data from backscattered ultrasound energy and corresponding ground truth data obtained from non-ultrasound sources. Once developed, the model may be implemented in software (e.g., within or separate from the pulmonary severity assessment engine) that receives the calculated value of the transport parameter of a subject with an unknown degree of severity of pulmonary fibrosis as input and that outputs a quantitative indication of severity of pulmonary fibrosis in the subject.

In step 1405, the process includes, receiving, from the model, a quantitative indication of the severity of pulmonary fibrosis of the subject that correlates with the transport parameter calculated for the subject. For example as described in step 1404, the model may output a score indicating a severity of pulmonary fibrosis to be present in the subject. Notably, the process can be utilized to conduct multiple measures and/or in multiple pleural spaces, thereby producing a plurality of severity scores.

While the disclosed method cannot diagnose pulmonary fibrosis, per se, it can be used to effectively monitor the condition and other lung abnormalities. For example, a higher than normal range scattering mean free path can imply that the lung ultrastructure is abnormal due to pulmonary fibrosis and/or other adverse lung conditions. Once a patient is known to have pulmonary fibrosis, the disclose subject matter can utilize scattering mean free path to correlate with the severity of fibrosis. As such, the disclosed subject matter is useful to follow patients in order to determine if their fibrosis condition is worsening or stabilizing.

In some embodiments, a quantitative indication of the severity of pulmonary fibrosis for a subject that correlates with the transport parameter for the subject is achievable if the subject has already been diagnosed with pulmonary fibrosis. For example, the diagnosis may be established by pulmonary function tests and a CT scan. Once diagnosed, the disease can be monitored with serial measurements of ultrasound multiple scattering (USMS), perhaps reducing the need for pulmonary function tests (especially DCLO, i.e., diffusing capacity of the lungs for carbon monoxide) and repeat CT scans, or may indicate that pulmonary fibrosis is worsening. This might affect a decision to list for lung transplant, the ultimate therapy to prevent death from pulmonary fibrosis.

The results output from the model can be used to determine whether more invasive or expensive methods of pulmonary fibrosis diagnostics are needed, to evaluate progression of pulmonary fibrosis over time, to evaluate effectiveness of treatment, etc. For example, in a clinical setting, backscattered ultrasound measurements can be obtained from a subject. For example, the backscattered ultrasound energy measurements can be obtained from different intercostal spaces of a subject's lungs. A transport parameter can be calculated from the measurements for each intercostal space. The transport parameters may be combined into a composite transport parameter, such as an average transport parameter. The composite transport parameter can be input into the model that correlates values of transport parameter with quantitative indications of severity of pulmonary fibrosis. The output of the model may be a score indicative of the severity of pulmonary statistically likely to be present in the subject. The score may be used to inform a clinical decision, such as whether CT scanning or pulmonary function testing, is needed. The values of the transport parameter calculated from ultrasound measurements at different times may be used to generate pulmonary fibrosis severity scores at different times, and the scores can be used to quantify progression of pulmonary fibrosis severity or effectiveness of a therapy for pulmonary fibrosis over time.

As described above, a statistical correlation exists between transport mean free path values derived from backscattered ultrasound energy and the severity of pulmonary fibrosis measured by CT scans and histology data for rat subjects. Notably, it is proposed that the same or a similar methodology (i.e., process 1400 indicated above) can be used to generate a model for correlating ultrasound-derived transport parameters and indications of severity of pulmonary fibrosis, in human subjects, with the exception that histological data will not be available from the lungs of live human subjects. For human subjects, the ground truth pulmonary fibrosis severity data can be obtained from CT scans of the lungs of live humans, pulmonary function testing of live humans, and histological studies of the lungs of deceased humans that have been explanted for transplant or autopsy. The backscattered ultrasound energy data for humans can be obtained using the methodology described above. Likewise, the transport mean free path, diffusion constant, or other transport parameters in the lungs for humans can be calculated in the same manner specified above (with respect to rat subjects). Further, the disclosed statistical correlations can also be determined for human subjects in the manner specified above. Thus, the term "subject", as used herein, is intended to refer to any mammalian subject, including rats and humans.

It will be understood that various details of the subject matter described herein may be changed without departing from the scope of the subject matter described herein. Furthermore, the foregoing description is for the purpose of illustration only, and not for the purpose of limitation. For example, various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

REFERENCES

All references listed in the instant disclosure, including but not limited to all patents, patent applications and publications thereof, scientific journal articles, and database entries are incorporated herein by reference in their entireties to the extent that they supplement, explain, provide a background for, or teach methodology, techniques, and/or embodiments employed herein.

Agricola, Eustachio, Tiziana Bove, Michele Oppizzi, Giovanni Marino, Alberto Zangrillo, Alberto Margonato, and Eugenio Picano. 2005. "'Ultrasound Comet-Tail Images': A Marker Of Pulmonary Edema." Chest. doi:10.1378/chest.127.5.1690.

Ashcroft, T., J. M. Simpson, and V. Timbrell. 1988. "Simple Method of Estimating Severity of Pulmonary Fibrosis on a Numerical Scale." Journal of Clinical Pathology 41 (4): 467-70. doi:10.1136/jcp.41.4.467.

Aubry, Alexandre, and Arnaud Derode. 2007. "Ultrasonic Imaging of Highly Scattering Media from Local Measurements of the Diffusion Constant: Separation of Coherent and Incoherent Intensities." Physical Review E—Statistical, Nonlinear, and Soft Matter Physics 75 (2): 1-9. doi:10.1103/PhysRevE.75.026602.

Aubry, Alexandre, Arnaud Derode, and Frederic Padilla. 2008. "Local Measurements of the Diffusion Constant in Multiple Scattering Media: Application to Human Trabecular Bone Imaging." The Journal of the Acoustical Society of America 123 (5): 3633. doi:10.1121/1.2934875.

Chaudhary, Nveed I., Andreas Schnapp, and John E. Park. 2006. "Pharmacologic Differentiation of Inflammation and Fibrosis in the Rat Bleomycin Model." American Journal of Respiratory and Critical Care Medicine. doi:10.1164/rccm.200505-717OC.

Crystal, Ronald G., Peter B. Bitterman, Brooke Mossman, Marvin I. Schwarz, Dean Sheppard, Laura Almasy, Harold A. Chapman, et al. 2002. "Future Research Directions in Idiopathic Pulmonary Fibrosis: Summary of a National Heart, Lung, and Blood Institute Working Group." American Journal of Respiratory and Critical Care Medicine 166 (2): 236-46. doi:10.1164/rccm.2201069.

Desai, Sujal R., Srihari Veeraraghavan, David M. Hansell, Ageliki Nikolakopolou, Nicole S. L. Goh, Andrew G. Nicholson, Thomas V. Colby, et al. 2007. "CT Features of Lung Disease in Patients with Systemic Sclerosis: Comparison with Idiopathic Pulmonary Fibrosis and Nonspecific Interstitial Pneumonia." Radiology. doi:10.1148/radiol.2322031223.

Gargani, L., F. Frassi, G. Soldati, P. Tesorio, M. Gheorghiade, and E. Picano. 2008. "Ultrasound Lung Comets for the Differential Diagnosis of Acute Cardiogenic Dyspnoea: A Comparison with Natriuretic Peptides." European Journal of Heart Failure. doi:10.1016/j.ejheart.2007.10.009.

Gargani, Luna, Marica Doveri, Luigia D'Errico, Francesca Frassi, Maria L. Bazzichi, Andrea Delle Sedie, Maria C. Scali, et al. 2009. "Ultrasound Lung Comets in Systemic Sclerosis: A Chest Sonography Hallmark of Pulmonary Interstitial Fibrosis." Rheumatology (Oxford, England). doi:10.1093/rheumatology/kep263.

Hübner, Ralf Harto, Wolfram Gitter, Nour Eddine El Mokhtari, Micaela Mathiak, Marcus Both, Hendrik Bolte, Sandra Freitag-Wolf, and Burkhard Bewig. 2008. "Standardized Quantification of Pulmonary Fibrosis in Histological Samples." BioTechniques 44 (4): 507-17. doi:10.2144/000112729.

Jambrik, Zoltan, Simonetta Monti, Vincenzo Coppola, Eustachio Agricola, Gaetano Mottola, Massimo Miniati, and Eugenio Picano. 2004. "Usefulness of Ultrasound Lung Comets as a Nonradiologic Sign of Extravascular Lung Water." American Journal of Cardiology. doi:10.1016/j.amjcard.2004.02.012.

Katzenstein, Anna-luise a, and Jeffrey L Myers. 1998. "Idiopathic Pulmonary Fibrosis Clinical Relevance of Pathologic Classification Clinical Features of the Idiopathic Interstitial Pneumonias." American Journal of Respiratory and Critical Care Medicine 157: 1301-15. doi:10.1164/ajrccm.157.4.9707039.

Launay, David, Martine Remy-Jardin, Ulrique Michon-Pasturel, Ioana Mastora, Eric Hachulla, Marc Lambert, Valerie Delannoy, et al. 2006. "High Resolution Computed Tomography in Fibrosing Alveolitis Associated with Systemic Sclerosis." Journal of Rheumatology.

Lichtenstein, Daniel A. 2016. Lung Ultrasound in the Critically Ill. The BLUE Protocol. doi:10.1007/978-3-319-15371-1.

Moeller, Antje, Kjetil Ask, David Warburton, Jack Gauldie, and Martin Kolb. 2008. "The Bleomycin Animal Model: A Useful Tool to Investigate Treatment Options for Idiopathic Pulmonary Fibrosis?" International Journal of Biochemistry and Cell Biology 40 (3): 362-82. doi:10.1016/j.biocel.2007.08.011.

Mohanty, Kaustav, John Blackwell, Thomas Egan, and Marie Muller. 2017. "Characterization of the Lung Parenchyma Using Ultrasound Multiple Scattering." Ultrasound in Medicine & Biology 43 (5): 993-1003. doi:10.1016/j.ultrasmedbio.2017.01.011.

Picano, Eugenio, Francesca Frassi, Eustachio Agricola, Suzana Gligorova, Luna Gargani, and Gaetano Mottola. 2006. "Ultrasound Lung Comets: A Clinically Useful Sign of Extravascular Lung Water." Journal of the American Society of Echocardiography. doi:10.1016/j.echo.2005.05.019.

Reißig, Angelika, and Claus Kroegel. 2003. "Transthoracic Sonography of Diffuse Parenchymal Lung Disease: The Role of Comet Tail Artifacts." Journal of Ultrasound in Medicine. doi:10.7863/jum.2003.22.2.173.

Robbe, Alexandre, Alexandra Tassin, Justine Carpentier, Anne Emilie Declèves, Zita Lea Mekinda Ngono, Denis Nonclercq, and Alexandre Legrand. 2015. "Intratracheal Bleomycin Aerosolization: The Best Route of Administration for a Scalable and Homogeneous Pulmonary Fibrosis Rat Model?" BioMed Research International 2015: 1-10. doi:10.1155/2015/198418.

Rojas, Mauricio, Jianguo Xu, Charles R. Woods, Ana L. Mora, Willy Spears, Jesse Roman, and Kenneth L. Brigham. 2005. "Bone Marrow-Derived Mesenchymal Stem Cells in Repair of the Injured Lung." American Journal of Respiratory Cell and Molecular Biology. doi:10.1165/rcmb.2004-0330OC.

Sayed, SuzanS, GamalM Agmy, AzzaF Said, and AhmedH Kasem. 2016. "Assessment of Transthoracic Sonography in Patients with Interstitial Lung Diseases." Egyptian Journal of Bronchology 10 (2): 105. doi:10.4103/1687-8426.184375.

Soldati, G., and S. Sher. 2009. "Bedside Lung Ultrasound in Critical Care Practice." Minerva Anestesiologica 75 (9): 509-17. doi:10.1186/cc5668.

Tourin, Arnaud, Arnaud Derode, Aymeric Peyre, and Mathias Fink. 2000. "Transport Parameters for an Ultrasonic Pulsed Wave Propagating in a Multiple Scattering Medium." The Journal of the Acoustical Society of America 108 (2): 503. doi:10.1121/1.429580.

Volpicelli, Giovanni, Alessandro Mussa, Giorgio Garofalo, Luciano Cardinale, Giovanna Casoli, Fabio Perotto, Cesare Fava, and Mauro Frascisco. 2006. "Bedside Lung Ultrasound in the Assessment of Alveolar-Interstitial Syndrome." American Journal of Emergency Medicine 24 (6): 689-96. doi:10.1016/j.ajem.2006.02.013.

Xu, Jianguo, Ana L. Mora, John LaVoy, Kenneth L. Brigham, and Mauricio Rojas. 2006. "Increased Bleomycin-Induced Lung Injury in Mice Deficient in the Transcription Factor T-Bet." American Journal of Physiology-Lung Cellular and Molecular Physiology. doi:10.1152/ajplung.00006.2006.

Yang, Feng, Wee Ser, Jufeng Yu, David Chee-Guan Foo, Daniel Poh Shuan Yeo, Pow-Li Chia, and Jennifer Wong. 2012. "Lung Water Detection Using Acoustic Techniques." Conference Proceedings: . . . Annual International Conference of the IEEE Engineering in Medicine and Biology Society. IEEE Engineering in Medicine and Biology Society. Annual Conference 2012: 4258-61. doi: 10.1109/EMBC.2012.6346907.

What is claimed is:

1. A method for quantifying severity of pulmonary fibrosis, the method comprising:
   transmitting ultrasound energy into lungs of a subject;
   detecting, using receiver transducer elements of an ultrasound transducer, waves of the ultrasound energy backscattered by structures in the lungs of the subject;
   calculating a transport parameter from the detected waves of the ultrasound energy backscattered by the structures in the lungs of the subject;
   inputting the transport parameter into a model that correlates values of the transport parameter with values of a severity score, wherein each value of the severity score indicates a percentage of lung volume currently affected by pulmonary fibrosis as determined from histological or computed tomography (CT) images of lungs having known values of the transport parameter and values of the severity score assigned by experts based on percentages of lung volume affected by pulmonary fibrosis; and
   receiving, from the model, a quantitative indication of the severity of pulmonary fibrosis for the subject that correlates with the transport parameter for the subject, wherein the quantitative indication comprises one of the values of the severity score indicative of a degree of the severity of pulmonary fibrosis for the subject, wherein the degree of the severity represents a percentage of lung volume of the subject that currently includes fibrotic tissue.

2. The method of claim 1 wherein the transport parameter comprises a diffusion constant.

3. The method of claim 1 wherein the transport parameter comprises a transport mean free path or a scattering mean free path.

4. The method of claim 1 wherein transmitting the ultrasound energy includes successively transmitting pulses of ultrasound energy into the lungs of the subject using individual elements or groups of elements of an ultrasound transducer and wherein detecting the ultrasound energy backscattered from the structures in the lungs of the subject includes detecting the backscattered ultrasound energy using elements of the transmitting ultrasound transducer or elements of an ultrasound transducer separate from the transmitting ultrasound transducer.

5. The method of claim 1 wherein transmitting the ultrasound energy includes transmitting pulses of ultrasound energy into the lungs of the subject using groups of elements of an ultrasound transducer in order to utilize at least one beamforming technique that creates virtual sources at a pleural surface of the lungs.

6. The method of claim 1 wherein calculating the transport parameter includes calculating an incoherent intensity from the backscattered ultrasound energy, calculating a diffusion constant of the subject's lungs from the incoherent intensity, and calculating a transport mean free path or a scattering mean free path from the diffusion constant.

7. The method of claim 1 wherein calculating the transport parameter includes calculating a coherent intensity from the backscattered ultrasound energy, calculating a diffusion constant of the subject's lungs from the coherent intensity, and calculating a transport mean free path from the diffusion constant.

8. The method of claim 1 wherein the model correlates values of the transport parameter with values of severity of pulmonary fibrosis obtained from the CT images of lungs of subjects having known values of the transport parameter and with varying degrees of severity of pulmonary fibrosis or with values of severity of pulmonary fibrosis obtained from lung function tests of subjects with varying degrees of severity of pulmonary fibrosis.

9. The method of claim 1 wherein the model correlates values of the transport parameter with values of severity of pulmonary fibrosis obtained from the histology images of lungs of subjects having known values of the transport parameter and with varying degrees of severity of pulmonary fibrosis or with values of severity of pulmonary fibrosis obtained from lung function tests of subjects with varying degrees of severity of pulmonary fibrosis.

10. The method of claim 1 wherein the indication of severity of pulmonary fibrosis output from the model comprises a numeric score indicative of severity of pulmonary fibrosis.

11. The method of claim 1 comprising repeating the transmitting, detecting, calculating, inputting, and receiving at different times for the subject to obtain quantifications of the severity of pulmonary fibrosis at different times and using the quantifications of the severity of pulmonary fibrosis at different times to determine a progression of the severity of pulmonary fibrosis over time for the subject.

12. The method of claim 1 wherein the ultrasound energy is transmitted into the lungs of the subject via portable ultrasound probe.

13. The method of claim 12 wherein a probe holder device is utilized to maintain a consistent angle between the portable ultrasound probe and a pleural surface of the lungs.

14. The method of claim 1 comprising performing a diagnostic or treatment action for the subject based on the quantification of severity of pulmonary fibrosis.

15. The method of claim 14 wherein performing the diagnostic or treatment action comprises performing a thin slice computed tomography or pulmonary function tests of the subject.

16. The method of claim 1 comprising performing the transmitting, detecting, and calculating to obtain values of the transport parameter for different intercostal spaces of the subject's lungs, combining the different values of the transport parameter into a composite transport parameter for the subject and wherein inputting the value of the transport parameter into the model includes inputting the composite transport parameter into the model.

17. The method of claim 16 wherein the composite value of the transport parameter comprises an average of the transport parameters calculated from the ultrasound measurements for the different intercostal spaces.

18. A system for quantifying severity of pulmonary fibrosis, the system comprising:
at least one processor;
a memory;
an array of ultrasound transducer elements configured to emit ultrasound signals and to receive backscattered ultrasound energy in lungs of a subject; and
a pulmonary severity assessment engine that, when stored in the memory and executed by the processor is configured to detect portions of the ultrasound energy backscattered by structures in the lungs of the subject, calculating a transport parameter from the detected portions of the ultrasound energy backscattered by the structures in the lungs of the subject, input the transport parameter into a model that correlates values of the transport parameter with values of a severity score, wherein each value of the severity score indicates a percentage of lung volume currently affected by pulmonary fibrosis as determined from histological or computed tomography (CT) images of lungs having known values of the transport parameter and values of the severity score assigned by experts based on percentages of lung volume affected by pulmonary fibrosis, and receive, from the model, a quantitative indication of the severity of pulmonary fibrosis for the subject that correlates with the transport parameter for the subject, wherein the quantitative indication comprises one of the values of the severity score indicative of a degree of the severity of pulmonary fibrosis for the subject, wherein the degree of the severity represents a percentage of lung volume of the subject that currently includes fibrotic tissue.

19. The system of claim 18 wherein the transport parameter comprises a diffusion constant.

20. The system of claim 18 wherein the transport parameter comprises a transport mean free path or a scattering mean free path.

21. The system of claim 18 wherein the array of ultrasound transducer elements is configured for successively transmitting pulses of ultrasound energy into the lungs of the subject using individual elements or groups of elements of an ultrasound transducer and wherein detecting the ultrasound energy backscattered from the structures in the lungs of the subject includes detecting the backscattered ultrasound energy using elements of the transmitting ultrasound transducer or elements of an ultrasound transducer separate from the transmitting ultrasound transducer.

22. The system of claim 18 wherein the array of ultrasound transducer elements is configured for transmitting pulses of ultrasound energy into the lungs of the subject using groups of elements of an ultrasound transducer in order to utilize at least one beamforming technique that creates virtual sources at a pleural surface of the lungs.

23. The system of claim 18 wherein the pulmonary severity assessment engine is configured for calculating an incoherent intensity from the backscattered ultrasound energy, calculating a diffusion constant of the subject's lungs from the incoherent intensity, and calculating a transport mean free path or a scattering mean free path from the diffusion constant and a transport velocity of ultrasound energy in the subject's lungs.

24. The system of claim 18 wherein the pulmonary severity assessment engine is configured for calculating a coherent intensity from the backscattered ultrasound energy, calculating a diffusion constant of the subject's lungs from the coherent intensity, and calculating a transport mean free path from the diffusion constant and a transport velocity of ultrasound energy in the subject's lungs.

25. The system of claim 18 wherein the model correlates values of the transport parameter with values of severity of pulmonary fibrosis obtained from computed tomography scans the CT images of lungs of subjects having known values of the transport parameter and with varying degrees of severity of pulmonary fibrosis.

26. The system of claim 18 wherein the model correlates values of the transport parameter with values of severity of pulmonary fibrosis obtained from histological studies of lungs of subjects with varying degrees of severity of pulmonary fibrosis.

27. The system of claim 18 wherein the indication of severity of pulmonary fibrosis output from the model comprises a numeric score indicative of severity of pulmonary fibrosis.

28. The system of claim 18 wherein the ultrasound energy is transmitted into the lungs of the subject via portable ultrasound probe lungs.

29. The system of claim 28 wherein a probe holder device is utilized to maintain a consistent angle between the portable ultrasound probe and a pleural surface of the lungs.

30. A non-transitory computer readable medium having stored thereon executable instructions that when executed by the processor of a computer control the computer to perform steps comprising:
receiving, as input, measurements of the ultrasound energy backscattered by structures in lungs of a subject and generated from ultrasound waves detected by receiver transducer elements of an ultrasound transducer;
calculating a transport parameter from the measurements of the ultrasound energy backscattered by the structures in the lungs of the subject;
inputting the transport parameter into a model that correlates values of the transport parameter with values of a severity score, wherein each value of the severity score indicates a percentage of lung volume currently affected by pulmonary fibrosis as determined from histological or computed tomography (CT) images of lungs having known values of the transport parameter and values of the severity score assigned by experts based on percentages of lung volume affected by pulmonary fibrosis; and
receiving, from the model, a quantitative indication of the severity of pulmonary fibrosis for the subject that correlates with the transport parameter calculated for the subject, wherein the quantitative indication comprises one of the values of the severity score indicative of a degree of the severity of pulmonary fibrosis for the subject, wherein the degree of the severity represents a percentage of lung volume of the subject that currently includes fibrotic tissue.

* * * * *